US008873657B2

(12) United States Patent
Liu et al.

(10) Patent No.: US 8,873,657 B2
(45) Date of Patent: Oct. 28, 2014

(54) DATA TRANSMISSION METHOD AND RELATED DEVICE AND SYSTEM

(71) Applicant: Huawei Technologies Co., Ltd., Guangdong (CN)

(72) Inventors: Sheng Liu, Shenzhen (CN); Rongdao Yu, Shenzhen (CN); Rui Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/026,865

(22) Filed: Sep. 13, 2013

(65) Prior Publication Data

US 2014/0029952 A1     Jan. 30, 2014

Related U.S. Application Data

(63) Continuation of application No. PCT/CN2012/072311, filed on Mar. 14, 2012.

(30) Foreign Application Priority Data

Mar. 15, 2011   (CN) .......................... 2011 1 0062155

(51) Int. Cl.
*H04L 27/28*    (2006.01)
*H04B 10/04*    (2006.01)

(52) U.S. Cl.
USPC .......................................... 375/260; 398/201

(58) Field of Classification Search
CPC .. H04B 7/0408; H04B 7/0413; H04B 7/0617; H04B 7/066; H04B 7/08; H04B 7/2045; H04B 7/208; H04B 7/2615; H04B 10/502; H04B 10/503; H04B 10/5059; H04B 10/50593; H04B 10/61; H04B 10/67; H04B 2201/696; H04B 220/698; H04B 2201/70727

USPC .......... 375/260, 261, 262, 265, 267; 370/208, 370/210, 337, 344; 398/128, 130, 135, 138, 398/140, 182, 200, 201, 202, 207, 212, 214
See application file for complete search history.

(56) References Cited

U.S. PATENT DOCUMENTS 7,095,709 B2   8/2006   Walton et al.
7,601,940 B2   10/2009  Chew et al.
(Continued)

FOREIGN PATENT DOCUMENTS

CN   101485119 A   7/2009
CN   101953097 A   1/2011
(Continued)

OTHER PUBLICATIONS

International Search Report in corresponding PCT Patent Application No. PCT/CN2012/072311 (Jun. 21, 2012).
(Continued)

*Primary Examiner* — Young T. Tse
(74) *Attorney, Agent, or Firm* — Huawei Technologies Co., Ltd.

(57) ABSTRACT

Embodiments of the present invention disclose a data transmission method and a related device and system. A data transmission method includes: A transmitter performs scrambling, constellation modulation, and multiple-input multiple-output precoding processing sequentially on downlink user data to obtain a precoded symbol sequence; performs time-frequency resource mapping on the precoded symbol sequence to obtain frequency domain data of an OFDM symbol; performs conjugate symmetric extension and IFFT on the frequency domain data of the OFDM symbol to obtain a time domain real-number sequence; performs CP insertion processing on the time domain real-number sequence to form a first downlink time domain baseband signal; loads the first downlink time domain baseband signal onto a direct current of a LED lighting circuit to form a LED driving electrical signal; and converts the LED driving electrical signal into a visible beam of the LED for transmission.

18 Claims, 16 Drawing Sheets

(56) References Cited

U.S. PATENT DOCUMENTS

| | | | |
|---|---|---|---|
| 7,652,773 B2* | 1/2010 | DiMarzio et al. | 356/502 |
| 2008/0230684 A1 | 9/2008 | Chew et al. | |
| 2009/0310973 A1 | 12/2009 | Broyde et al. | |
| 2010/0166089 A1* | 7/2010 | Seki | 375/260 |
| 2010/0316389 A1 | 12/2010 | Walewski | |
| 2011/0002695 A1 | 1/2011 | Choi et al. | |
| 2012/0213517 A1* | 8/2012 | Ji et al. | 398/48 |
| 2012/0294616 A1* | 11/2012 | Sasaki | 398/79 |
| 2013/0126713 A1* | 5/2013 | Haas et al. | 250/208.2 |
| 2013/0201912 A1* | 8/2013 | Sheng et al. | 370/328 |

FOREIGN PATENT DOCUMENTS

| | | |
|---|---|---|
| CN | 101960808 A | 1/2011 |
| EP | 1928115 A1 | 6/2008 |
| WO | 2009004735 A1 | 1/2009 |
| WO | 2009106542 A1 | 9/2009 |

OTHER PUBLICATIONS

Jiang et al., "Space-Time-Frequency Coded OFDM Technique for Broadband Wireless Communications," 2004, Journal of Shanghai Jiaotong University, Shanghai, China.

S. K. Hashemi et al. :"Orthogonal Frequency Division Multiplexing for Indoor Optical Wireless Communications using Visible Light LEDs", Dec. 31, 2008, total 5 pages.

Jiang Haining et al. :"Space-time-frequency coded OFDM technique for broadband wireless communications.", Nov. 2004, total 5 pages.

Jansan S L et al:"Long-haul transmission of 16x52.2 Gbits/s polarization-division-multiplexed OFDM enable by MIMO processing",vol. 7.No. 2, Journal of optical networking, dated Feb. 2008, total 10 pages.

* cited by examiner

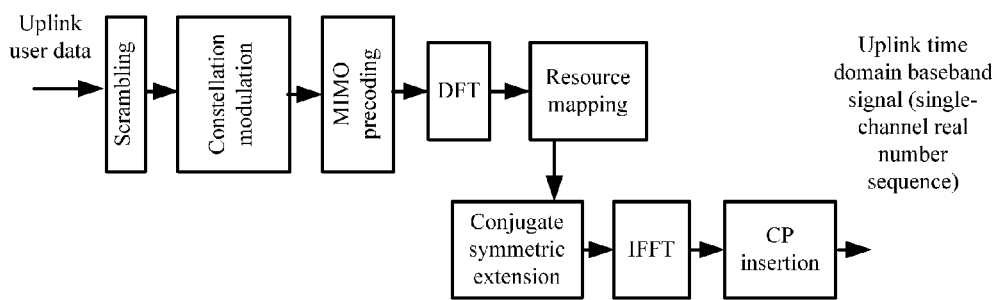

FIG. 13

```
┌─────────────────────────────────────────────────────────────────────────┐ 1401
│ A receiver receives a visible beam of a LED and performs optical-to-electrical conversion │
│                to obtain a first uplink time domain baseband signal                       │
└─────────────────────────────────────────────────────────────────────────┘
                                    │
                                    ▼
┌─────────────────────────────────────────────────────────────────────────┐ 1402
│ The receiver performs CP removal, FFT, and conjugate symmetry removal processing on │
│ the obtained first uplink time domain baseband signal to obtain frequency domain data of │
│                                 an SC-FDMA symbol                                          │
└─────────────────────────────────────────────────────────────────────────┘
                                    │
                                    ▼
┌─────────────────────────────────────────────────────────────────────────┐ 1403
│ The receiver performs SC-FDMA resource demapping, IDFT, MIMO detection, channel │
│ equalization, constellation demodulation, and descrambling processing sequentially on │
│ the obtained frequency domain data of the SC-FDMA symbol to obtain uplink user data │
└─────────────────────────────────────────────────────────────────────────┘
```

FIG. 14

DATA TRANSMISSION METHOD AND RELATED DEVICE AND SYSTEM

CROSS-REFERENCE TO RELATED APPLICATIONS

This application is a continuation of International Patent Application No. PCT/CN2012/072311, filed on Mar. 14, 2012, which claims priority to Chinese Patent Application No. 201110062155.4, filed on Mar. 15, 2011, both of which are hereby incorporated by reference in their entireties.

FIELD OF THE INVENTION

The present invention relates to the data transmission field, and in particular, to a data transmission method and a related device and system.

BACKGROUND OF THE INVENTION

In a conventional radio frequency communication system, for example, in a long term evolution (Long Term Evolution, LTE) system, data transmission is implemented based on radio frequency communication, namely, LTE over RF. The radio frequency communication needs to occupy a certain number of radio spectrums, which leads to an increasing shortage of radio spectrum resources, and furthermore, the radio frequency communication is vulnerable to electromagnetic interference. Especially, interference on a user at the edge of a cell is most serious. In another aspect, the radio frequency communication brings certain radiation to the human body.

Therefore, it is urgent to develop a new data transmission manner to solve problems existing in the conventional radio frequency communication.

SUMMARY OF THE INVENTION

To solve the foregoing problems, embodiments of the present invention provide a data transmission method and a related device and system, so that data transmission can be implemented in the case of no transmission resource restriction, no electromagnetic interference, and no radiation to the human body.

A data transmission method includes:

performing, by a transmitter, scrambling, constellation modulation, and multiple-input multiple-output precoding processing sequentially on downlink user data to obtain a precoded symbol sequence;

performing, by the transmitter, time-frequency resource mapping on the precoded symbol sequence to obtain frequency domain data of an orthogonal frequency division multiplexing symbol;

performing, by the transmitter, conjugate symmetric extension and inverse fast Fourier transform on the frequency domain data of the orthogonal frequency division multiplexing symbol to obtain a time domain real-number sequence;

performing, by the transmitter, cyclic prefix insertion processing on the time domain real-number sequence to form a first downlink time domain baseband signal;

loading, by the transmitter, the first downlink time domain baseband signal onto a direct current of a light-emitting diode lighting circuit to form a light-emitting diode driving electrical signal; and converting, by the transmitter, the light-emitting diode driving electrical signal into a visible beam of the light-emitting diode for transmission.

Another data transmission method includes:

performing, by a transmitter, scrambling, constellation modulation, multiple-input multiple-output precoding, and discrete Fourier transform processing sequentially on uplink user data to obtain a discrete Fourier transform symbol sequence;

performing, by the transmitter, single-carrier frequency division multiple access resource mapping on the discrete Fourier transform symbol sequence to obtain frequency domain data of a single-carrier frequency division multiple access symbol;

performing, by the transmitter, conjugate symmetric extension and inverse fast Fourier transform on the frequency domain data of the single-carrier frequency division multiple access symbol to obtain a time domain real-number sequence;

performing, by the transmitter, cyclic prefix insertion processing on the time domain real-number sequence to form a first uplink time domain baseband signal;

loading, by the transmitter, the first uplink time domain baseband signal onto a direct current of a light-emitting diode lighting circuit to form a light-emitting diode driving electrical signal; and converting, by the transmitter, the light-emitting diode driving electrical signal into a visible beam of the light-emitting diode for transmission.

A transmitter includes:

a first processing unit, configured to perform scrambling, constellation modulation, and multiple-input multiple-output precoding processing sequentially on downlink user data to obtain a precoded symbol sequence;

a second processing unit, configured to perform time-frequency resource mapping on the precoded symbol sequence obtained by the first processing unit, to obtain frequency domain data of an orthogonal frequency division multiplexing symbol;

a third processing unit, configured to perform conjugate symmetric extension on the frequency domain data of the orthogonal frequency division multiplexing symbol, where the frequency domain data of the orthogonal frequency division multiplexing symbol is obtained by the second processing unit;

a fourth processing unit, configured to perform inverse fast Fourier transform on the frequency domain data after conjugate symmetric extension is performed by the third processing unit, to obtain a time domain real-number sequence;

a fifth processing unit, configured to perform cyclic prefix insertion processing on the time domain real-number sequence obtained by the fourth processing unit, to form a first downlink time domain baseband signal;

a sixth processing unit, configured to load the first downlink time domain baseband signal onto a direct current of a light-emitting diode lighting circuit to form a light-emitting diode driving electrical signal; and a seventh processing unit, configured to convert the light-emitting diode driving electrical signal into a visible beam of the light-emitting diode for transmission.

Another transmitter includes:

a first processing module, configured to perform scrambling, constellation modulation, multiple-input multiple-output precoding, and discrete Fourier transform processing sequentially on uplink user data to obtain a discrete Fourier transform symbol sequence;

a second processing module, configured to perform single-carrier frequency division multiple access resource mapping on the discrete Fourier transform symbol sequence obtained by the first processing module, to obtain frequency domain data of a single-carrier frequency division multiple access symbol;

a third processing module, configured to perform conjugate symmetric extension on the frequency domain data of the single-carrier frequency division multiple access symbol, where the frequency domain data of the single-carrier frequency division multiple access symbol is obtained by the second processing module;

a fourth processing module, configured to perform inverse fast Fourier transform on the frequency domain data after conjugate symmetric extension is performed by the third processing module, to obtain a time domain real-number sequence;

a fifth processing module, configured to perform cyclic prefix insertion processing on the time domain real-number sequence obtained by the fourth processing module, to form a first uplink time domain baseband signal;

a sixth processing module, configured to load the first uplink time domain baseband signal onto a direct current of a light-emitting diode lighting circuit to form a light-emitting diode driving electrical signal; and a seventh processing module, configured to convert the light-emitting diode driving electrical signal into a visible beam of the light-emitting diode for transmission.

A data transmission system includes:

a transmitter, configured to: perform scrambling, constellation modulation, and multiple-input multiple-output precoding processing sequentially on downlink user data to obtain a precoded symbol sequence; perform time-frequency resource mapping on the precoded symbol sequence to obtain frequency domain data of an orthogonal frequency division multiplexing symbol; perform conjugate symmetric extension and inverse fast Fourier transform on the frequency domain data of the orthogonal frequency division multiplexing symbol to obtain a time domain real-number sequence; perform cyclic prefix insertion processing on the time domain real-number sequence to form a first downlink time domain baseband signal; load the first downlink time domain baseband signal onto a direct current of a light-emitting diode lighting circuit to form a light-emitting diode driving electrical signal; and convert the light-emitting diode driving electrical signal into a visible beam of the light-emitting diode for transmission; and a receiver, configured to: receive a visible beam of the light-emitting diode and perform optical-to-electrical conversion to obtain a first downlink time domain baseband signal; perform cyclic prefix removal, fast Fourier transform, and conjugate symmetry removal processing on the obtained first downlink time domain baseband signal to obtain frequency domain data of an orthogonal frequency division multiplexing symbol; perform resource demapping processing on the obtained frequency domain data of the orthogonal frequency division multiplexing symbol to obtain a precoded symbol sequence; and perform multiple-input multiple-output detection, channel equalization, constellation demodulation, and descrambling processing sequentially on the obtained precoded symbol sequence to obtain downlink user data.

Another data transmission system includes:

a transmitter, configured to: perform scrambling, constellation modulation, multiple-input multiple-output precoding, and discrete Fourier transform processing sequentially on uplink user data to obtain a discrete Fourier transform symbol sequence; perform single-carrier frequency division multiple access resource mapping on the discrete Fourier transform symbol sequence to obtain frequency domain data of a single-carrier frequency division multiple access symbol; perform conjugate symmetric extension and inverse fast Fourier transform on the frequency domain data of the single-carrier frequency division multiple access symbol to obtain a time domain real-number sequence; perform cyclic prefix insertion processing on the time domain real-number sequence to form a first uplink time domain baseband signal; load the first uplink time domain baseband signal onto a direct current of a light-emitting diode lighting circuit to form a light-emitting diode driving electrical signal; and convert the light-emitting diode driving electrical signal into a visible beam of the light-emitting diode for transmission; and a receiver, configured to: receive a visible beam of the light-emitting diode and perform optical-to-electrical conversion to obtain a first uplink time domain baseband signal; perform cyclic prefix removal, fast Fourier transform, and conjugate symmetry removal processing on the obtained first uplink time domain baseband signal to obtain frequency domain data of a single-carrier frequency division multiple access symbol; and perform single-carrier frequency division multiple access resource demapping, inverse discrete Fourier transform, multiple-input multiple-output detection, channel equalization, constellation demodulation, and descrambling processing sequentially on the obtained frequency domain data of the single-carrier frequency division multiple access symbol to obtain uplink user data.

In the embodiments of the present invention, after obtaining frequency domain data of an orthogonal frequency division multiplexing symbol in a downlink direction, the transmitter performs conjugate symmetric extension and inverse fast Fourier transform on the frequency domain data of the orthogonal frequency division multiplexing symbol to obtain a time domain real-number sequence, and performs cyclic prefix insertion processing to form a first downlink time domain baseband signal. The first downlink time domain baseband signal is loaded onto a direct current of a light-emitting diode lighting circuit to form a light-emitting diode driving electrical signal. In this way, the transmitter can convert the light-emitting diode driving electrical signal into a visible beam of a light-emitting diode for transmission. In the embodiments of the present invention, after obtaining frequency domain data of a single-carrier frequency division multiple access symbol in an uplink direction, the transmitter performs conjugate symmetric extension and inverse fast Fourier transform on the frequency domain data of the single-carrier frequency division multiple access symbol to obtain a time domain real-number sequence, and performs cyclic prefix insertion processing on the time domain real-number sequence to form a first uplink time domain baseband signal. The first uplink time domain baseband signal is loaded onto a direct current of a light-emitting diode lighting circuit to form a light-emitting diode driving electrical signal. In this way, the transmitter can convert the light-emitting diode driving electrical signal into a visible beam of a light-emitting diode for transmission. It can be seen that, in the embodiments of the present invention, data transmission may be implemented through visible light of a light-emitting diode. Visible light transmission requires no radio spectrum license, and is free from supervision of relevant governments and organizations. Therefore, the visible light transmission is free from transmission resource restriction. Moreover, the visible light transmission is free from electromagnetic interference, does not affect receiving performance and experience of a user, and brings no radiation to the human body.

BRIEF DESCRIPTION OF THE DRAWINGS

To make the technical solutions in the embodiments of the present invention or in the prior art clearer, the accompanying drawings required in the embodiments are briefly introduced in the following. Evidently, the accompanying drawings in the following description are only some embodiments of the present invention, and persons of ordinary skill in the art may also derive other drawings from these accompanying drawings without creative efforts.

FIG. 13 is a schematic structural diagram of an uplink transmitter for implementing a data transmission method illustrated in FIG. 12 according to an embodiment of the present invention;

FIG. 14 is a schematic flowchart of a data processing method of an uplink receiver according to an embodiment of the present invention;

DETAILED DESCRIPTION OF THE EMBODIMENTS

The technical solutions in the embodiments of the present invention are described clearly and completely in the following with reference to the accompanying drawings in the embodiments of the present invention. Evidently, the embodiments to be described are only a part rather than all of the embodiments of the present invention. Based on the embodiments of the present invention, all other embodiments derived by persons of ordinary skill in the art without creative efforts shall fall within the protection scope of the present invention.

Before the embodiments of the present invention are described, relevant concepts involved in the embodiments of the present invention are explained.

A light-emitting diode (Light Emitting Diode, LED) is a solid semiconductor device that is capable of converting electrical power into visible light directly. Compared with a conventional lighting source, the LED has advantages such as low power consumption, long life, small size, environment-friendliness, excellent modulation performance, and high sensitivity. By using the foregoing features of the LED, the LED may also convert a signal into a visible LED beam for transmission at the same time when the LED is used for illumination, so that a new emerging light radio communication technology, namely, a visible light communication (Visible Light Communication, VLC) technology is implemented. The essence of the VLC technology is to use a high-speed bright-dark flickering signal emitted by a LED (or a fluorescent lamp) to transmit information. Compared with a conventional radio frequency (Radio Frequency, RF) communication, the VLC technology has advantages of no electromagnetic interference, no radiation to the human body, and abundant visible light resources. Therefore, the VLC technology has great development prospects.

Figure 1:
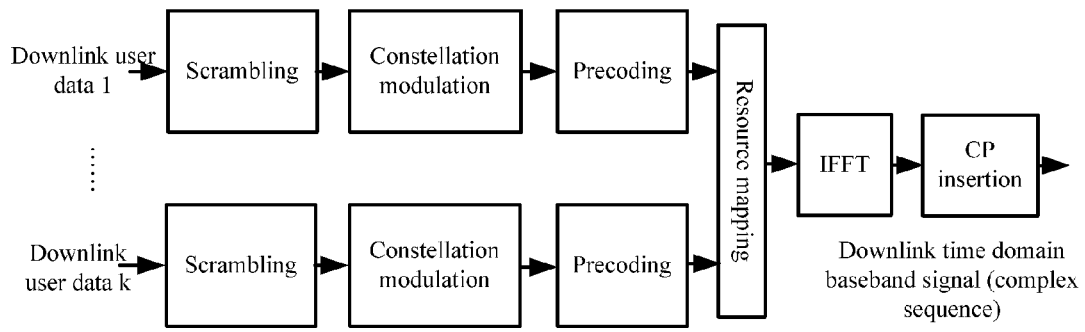
FIG. 1 is a schematic structural diagram of an LTE-over-RF downlink transmitter in the prior art.

The embodiments of the present invention provide a data transmission method and a related device and system, so that data transmission can be implemented in the case of no transmission resource restriction, no electromagnetic interference, and no radiation to the human body. A system to which the data transmission method and the related device and system provided in the embodiments of the present invention are applicable includes but is not limited to an LTE system. The embodiments of the present invention are described in detail subsequently by taking an LTE system as an example. In a conventional LTE system, data transmission is implemented based on radio frequency communication, namely, LTE over RF. A structure of an LTE-over-RF downlink transmitter in the prior art is shown in FIG. 1. After downlink user data (1 . . . k) sequentially undergoes scrambling, constellation modulation, multiple-input multiple-output (Multiple-Input Multiple-Output, MIMO) precoding, time-frequency resource mapping, inverse fast Fourier transform (Inverse Fast Fourier Transform, IFFT), and cyclic prefix (Cyclic Prefix, CP) insertion processing, a downlink time domain baseband signal is obtained, and is transmitted through a radio frequency. In the downlink transmitter shown in FIG. 1, a signal output after the IFFT is a complex sequence. Because receiving of visible light is non-coherent receiving, intensity modulation (Intensity Modulation, IM) is generally adopted, which requires that an input signal should be a real-number sequence. Therefore, the downlink time domain baseband signal (a complex sequence) output by the downlink transmitter shown in FIG. 1 cannot directly drive LED visible light for communication.

Figure 2:
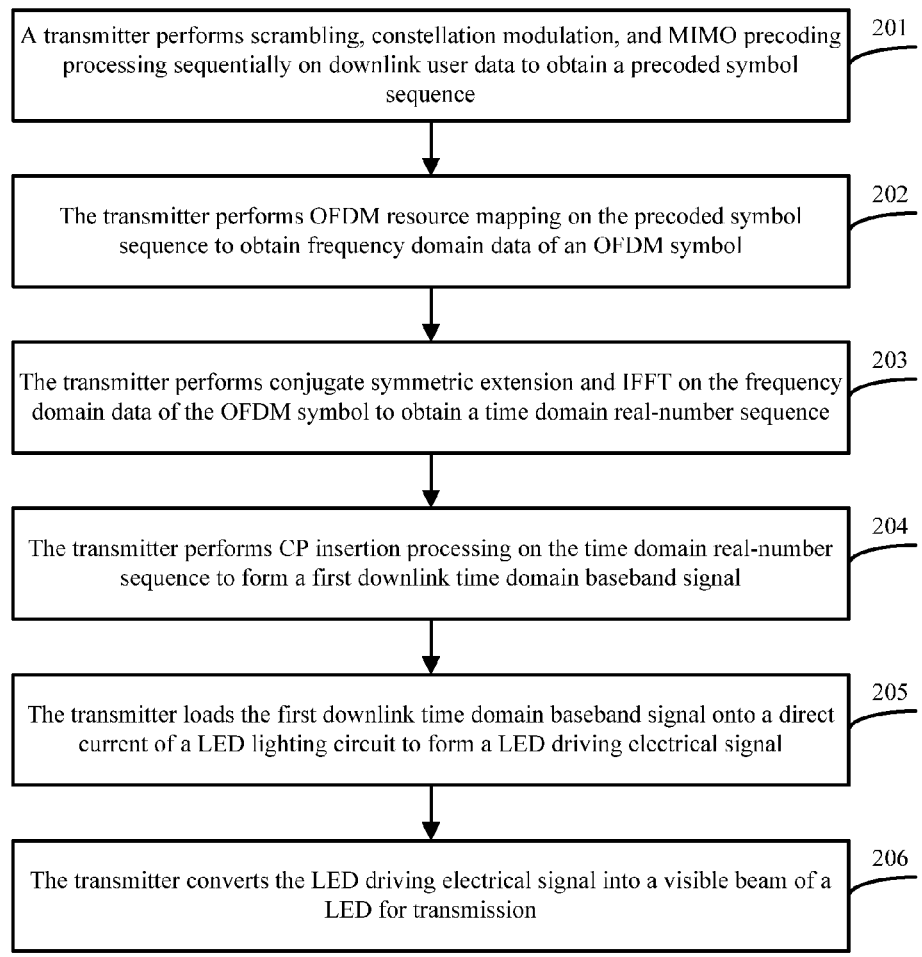
FIG. 2 is a schematic flowchart of a data transmission method according to an embodiment of the present invention.

Referring to FIG. 2, FIG. 2 is a schematic flowchart of a data transmission method according to an embodiment of the present invention. With this method, downlink transmission of data can be implemented in the case of no transmission resource restriction, no electromagnetic interference, and no radiation to the human body. Although the method is described in FIG. 2 by using an LTE system as an application scenario, those skilled in the art may understand that the data transmission method provided in this embodiment of the present invention is also applicable to other communication systems to implement visible light communication, which is not limited in this embodiment of the present invention. As shown in FIG. 2, the data transmission method may include the following steps.

201: A transmitter performs scrambling, constellation modulation, and MIMO precoding processing sequentially on downlink user data to obtain a precoded symbol sequence.

For example, the transmitter may use the following constellation modulation manners: binary phase shift keying (Binary Phase Shift Keying, BPSK), quadrature phase shift keying (Quadrature Phase Shift Keying, QPSK), 16 quadrature amplitude modulation (16 Quadrature Amplitude Modulation, 16QAM), 64 quadrature amplitude modulation (64 Quadrature Amplitude Modulation, 64QAM), and so on.

202: The transmitter performs time-frequency resource mapping on the precoded symbol sequence to obtain frequency domain data of an orthogonal frequency division multiplexing (Orthogonal Frequency Division Multiplexing, OFDM) symbol.

The transmitter may map the precoded symbol sequence to a time-frequency resource according to a resource mapping rule of different physical channels, so that frequency domain data of an OFDM symbol may be obtained.

203: The transmitter performs conjugate symmetric extension and IFFT on the frequency domain data of the OFDM symbol to obtain a time domain real-number sequence.

In this embodiment of the present invention, performing the conjugate symmetric extension by the transmitter on the frequency domain data of the OFDM symbol refers to adding conjugate symmetric data into the frequency domain data of the OFDM symbol. IFFT is performed on the frequency domain data of the OFDM symbol after the conjugate symmetric data is added, so that a time domain real-number sequence may be obtained.

204: The transmitter performs CP insertion processing on the time domain real-number sequence to form a first downlink time domain baseband signal.

In this embodiment of the present invention, the transmitter inserts a CP into the time domain real-number sequence, so that inter-symbol interference caused by multiple paths can be resisted. Because the transmitter obtains the time domain real-number sequence in step 203, the first downlink time domain baseband signal formed by the transmitter in step 204 is also a real-number sequence.

205: The transmitter loads the first downlink time domain baseband signal onto a direct current of a LED lighting circuit to form a LED driving electrical signal.

In this embodiment of the present invention, after the first downlink time domain baseband signal, which is a real-number sequence, is loaded onto the direct current of the LED lighting circuit, a LED driving electrical signal may be formed. The LED driving electrical signal can drive a LED to emit visible light.

206: The transmitter converts the LED driving electrical signal into a visible beam of the LED for transmission.

Optionally, in the foregoing step 205, the transmitter may also load the first downlink time domain baseband signal (a real-number sequence) onto a direct current of a fluorescent lighting circuit to form a fluorescent lamp driving electrical signal. Correspondingly, in the foregoing step 206, the transmitter may convert the fluorescent lamp driving electrical signal into a visible beam of a fluorescent lamp for transmission.

In this embodiment of the present invention, after obtaining frequency domain data of an orthogonal frequency division multiplexing symbol in a downlink direction, the transmitter performs conjugate symmetric extension and IFFT on the frequency domain data of the orthogonal frequency division multiplexing symbol to obtain a time domain real-number sequence, and performs CP insertion to form a first downlink time domain baseband signal. The first downlink time domain baseband signal is loaded onto a direct current of a LED lighting circuit to form a LED driving electrical signal. In this way, the transmitter can convert the LED driving electrical signal into a visible beam of a LED for transmission. In this embodiment of the present invention, downlink transmission of data may be implemented through visible light of a LED. Visible light transmission requires no radio spectrum license, and is free from supervision of relevant governments and organizations. Therefore, the visible light transmission is free from transmission resource restriction. Moreover, the visible light transmission is free from electromagnetic interference, and does not affect receiving performance and experience of a user, and brings no radiation to the human body.

Figure 3:
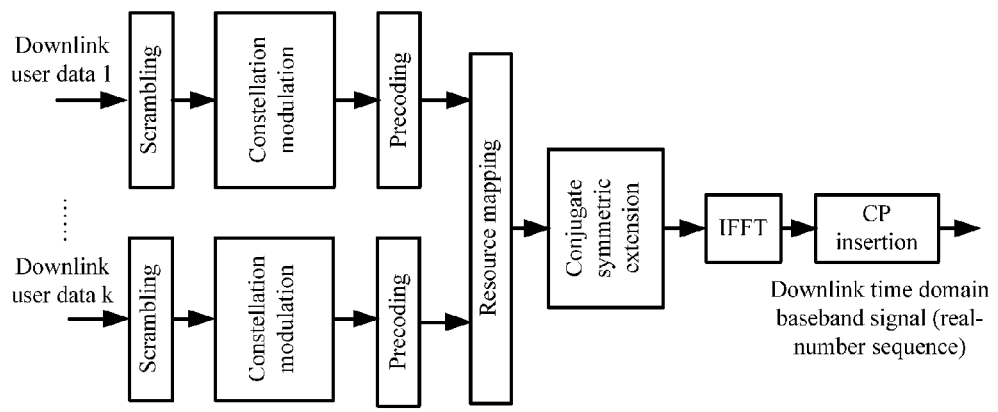
FIG. 3 is a schematic structural diagram of a downlink transmitter for implementing a data transmission method illustrated in FIG. 2 according to an embodiment of the present invention.

The data transmission method illustrated in FIG. 2 is implemented based on VLC in an LTE system, namely, LTE over VLC. To better understand the data transmission method illustrated in FIG. 2, the data transmission method is described in further detail in the following with reference to a specific LTE-over-VLC downlink transmitter. FIG. 3 is a schematic structural diagram of an LTE-over-VLC downlink transmitter according to an embodiment of the present invention. The downlink transmitter may be configured to implement the data transmission method illustrated in FIG. 2. In the downlink transmitter shown in FIG. 3, to minimize change of an existing LTE-over-RF downlink transmitter, an existing LTE-over-RF resource mapping manner is reused completely, and LTE over VLC whose signal bandwidth is W is equivalent to LTE over RF whose signal bandwidth is W/2. For example, LTE over VLC whose signal bandwidth is 20 MHz is equivalent to LTE over RF whose signal bandwidth is 10 MHz. A specific process that the downlink transmitter shown in FIG. 3 is configured to implement the data transmission method illustrated in FIG. 2 may be as follows:

(1) Before constellation modulation is performed on a bit sequence b(0), b(1), ..., b($M_{bit}$−1) of downlink user data k, the bit sequence is scrambled to generate a scrambled bit sequence $\tilde{b}$(0), $\tilde{b}$(1), ..., $\tilde{b}$($M_{bit}$−1).

(2) Constellation modulation is performed on the scrambled bit sequence $\tilde{b}$(0), $\tilde{b}$(1), ..., $\tilde{b}$($M_{bit}$−1) to generate a complex-value modulation symbol sequence d(0), d(1), ..., d($M_{symb}$−1).

Adoptable constellation modulation manners may be BPSK, QPSK, 16QAM, 64QAM, and so on. For example, if constellation modulation is performed in a QPSK manner, bits 00 may be mapped to $$\frac{1}{\sqrt{2}} + j\frac{1}{\sqrt{2}},$$

bits 01 may be mapped to $$\frac{1}{\sqrt{2}} - j\frac{1}{\sqrt{2}},$$

bits 10 may be mapped to $$-\frac{1}{\sqrt{2}} + j\frac{1}{\sqrt{2}},$$

and bits 11 may be mapped to $$-\frac{1}{\sqrt{2}} - j\frac{1}{\sqrt{2}}.$$

(3) MIMO precoding is performed on the complex-value modulation symbol sequence d(0), d(1), ..., d($M_{symb}$−1) to generate a precoded complex symbol sequence y(0), y(1), ..., y($M_{symb}^{op}$−1).

(4) According to a resource mapping rule of different physical channels, time domain resource mapping is performed on the precoded symbol sequence y(0), y(1), ..., y($M_{symb}^{op}$−1), so that frequency domain data of an $1^{th}$ OFDM symbol may be obtained, where the frequency domain data is $a_l$(0), $a_l$(1), ..., $a_l$(N−1).

Figure 4:
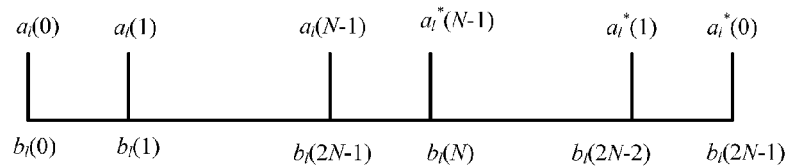
FIG. 4 is a schematic diagram of conjugate symmetry of frequency domain data of an OFDM symbol according to an embodiment of the present invention.

(5) Conjugate symmetric extension is performed (namely, conjugate symmetric data is added) on frequency domain data $a_l$(0), $a_l$(1), ..., $a_l$(N−1) of each OFDM symbol to form a new data sequence $b_l$(0), $b_l$(1), ..., $b_l$(N−1), $b_l$(N) ..., b(2N−2), b(2N−1). Correspondence between each element b and sequence a is shown in FIG. 4.

(6) IFFT is performed on the new data sequence obtained after conjugate symmetric extension (namely, adding conjugate symmetric data) is performed, to obtain a time domain real-number sequence. Formula (1) in the following may be used to perform IFFT on the new data sequence obtained after conjugate symmetric extension (namely, adding conjugate symmetric data) is performed:

$$s_k = \frac{1}{2N} \sum_{n=0}^{2N-1} b_l(n) \exp\left(j\frac{\pi}{N}nk\right), k = 0, 1, \ldots, 2N-1 \quad (1)$$

N represents the quantity of frequency domain data, and $s_k$ represents the time domain real-number sequence.

(7) To resist inter-symbol interference caused by multiple paths, a CP is inserted into the time domain real-number sequence after the IFFT to form a first downlink time domain baseband signal (a real-number sequence).

For example, the last G samples of the OFDM symbol may be copied to the forepart of the OFDM, the CP is inserted into the time domain real-number sequence after the IFFT to form the first downlink time domain baseband signal (real-number sequence).

(8) The first downlink time domain baseband signal is loaded onto a direct current of a LED lighting circuit to form a LED driving electrical signal.

(9) The LED driving electrical signal is converted into a visible beam of a LED for transmission.

Specific implementation processes of (8) and (9) are detailed subsequently in the embodiments of the present invention with reference to specific embodiments.

Figure 5:
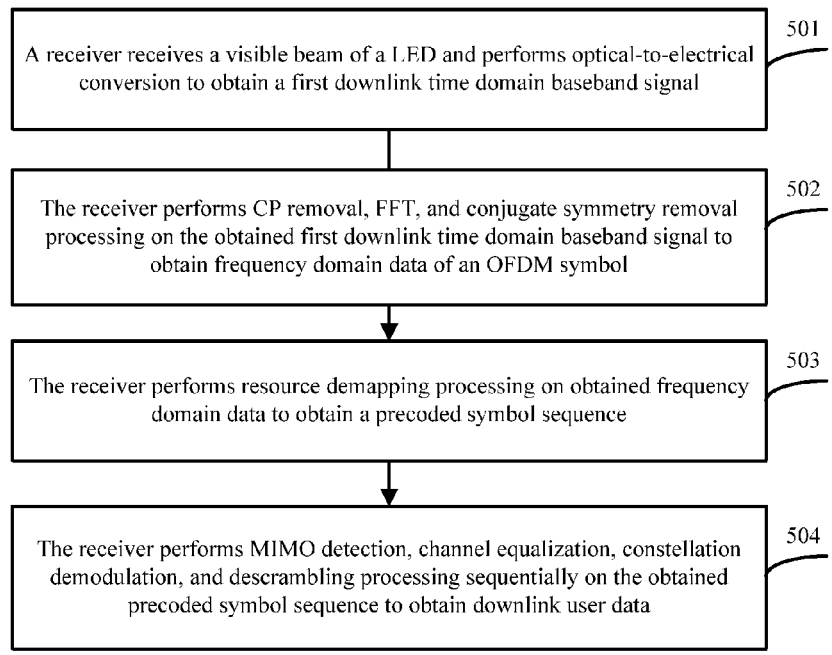
FIG. 5 is a schematic flowchart of a data processing method of a downlink receiver according to an embodiment of the present invention.

The data transmission method illustrated in FIG. 2 is described in the foregoing with reference to a specific LTE-over-VLC downlink transmitter. FIG. 2 illustrates an LTE-over-VLC downlink transmission method of data. For the LTE-over-VLC downlink transmission method of data illustrated in FIG. 2, an embodiment of the present invention further provides a data processing method of a downlink receiver (which is similar to a user-side terminal) correspondingly. As shown in FIG. 5, an implementation process of the data processing method of the downlink receiver may include the following steps.

501: A receiver receives a visible beam of a LED and performs optical-to-electrical conversion to obtain a first downlink time domain baseband signal (a real-number sequence).

In the method illustrated in FIG. 5, the receiver may be a mobile phone, a notebook, or another smart device, which is not limited in this embodiment of the present invention.

The receiver may obtain an electrical signal through the optical-to-electrical conversion for the received visible beam of the LED, and may extract the first downlink time domain baseband signal (real-number sequence) from the electrical signal.

502: The receiver performs CP removal, FFT, and conjugate symmetry removal processing on the obtained first downlink time domain baseband signal to obtain frequency domain data of an OFDM symbol.

503: The receiver performs resource demapping processing on the obtained frequency domain data of the OFDM symbol to obtain a precoded symbol sequence.

504: The receiver performs MIMO detection, channel equalization, constellation demodulation, and descrambling processing sequentially on the obtained precoded symbol sequence to obtain downlink user data.

The MIMO detection and the channel equalization are an inverse process of MIMO precoding. That is, the receiver may obtain a complex-value modulation symbol sequence after performing the MIMO detection and the channel equalization on the obtained precoded symbol sequence. Then constellation demodulation processing may be performed on the complex-value modulation symbol sequence to obtain a scrambled bit sequence, and then the scrambled bit sequence may be descrambled to obtain downlink user data.

Figure 6:
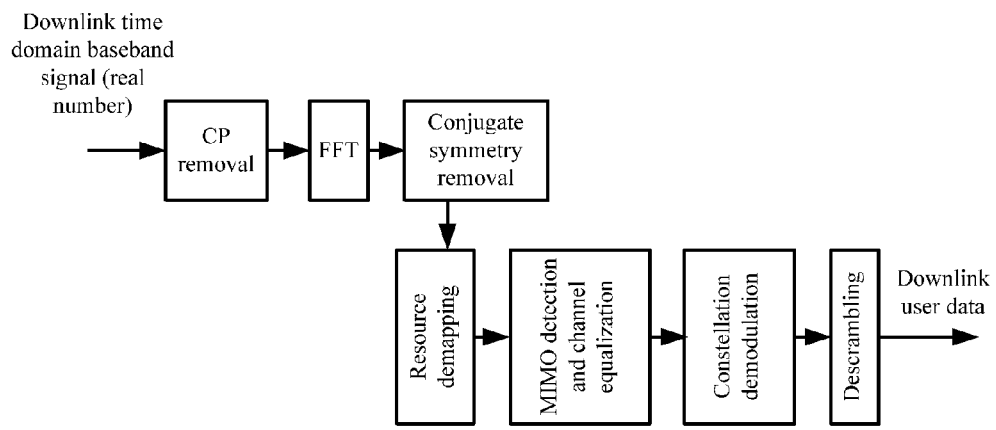
FIG. 6 is a schematic structural diagram of an LTE-over-VLC downlink receiver according to an embodiment of the present invention.

To better understand the data processing method of the receiver illustrated in FIG. 5, the data processing method is described in further detail in the following with reference to a specific LTE-over-VLC downlink receiver. Referring to FIG. 6, FIG. 6 is a schematic structural diagram of an LTE-over-VLC downlink receiver according to an embodiment of the present invention. The downlink receiver may be configured to implement the data processing method illustrated in FIG. 5. A specific process that the downlink receiver shown in FIG. 6 is configured to implement the data processing method illustrated in FIG. 5 may be as follows:

(1) After receiving a visible beam of a LED, perform optical-to-electrical conversion processing on the visible beam of the LED to obtain a first downlink time domain baseband signal, where the first downlink time domain baseband signal is a real-number sequence. Remove a CP to obtain a time domain real-number sequence.

(2) Perform FFT on the time domain real-number sequence obtained by removing the CP, to obtain a data sequence after conjugate symmetric extension.

(3) Perform conjugate symmetry removal processing on the data sequence after conjugate symmetric extension to obtain frequency domain data of an OFDM symbol.

(4) According to a resource mapping rule of different physical channels, perform resource demapping processing on the frequency domain data of the OFDM symbol by using a corresponding resource demapping manner to obtain a precoded symbol sequence.

(5) According to a MIMO transmission manner used by a transmitter, perform MIMO detection and channel equalization to obtain a complex-value modulation symbol sequence that undergoes constellation modulation.

(6) Perform constellation demodulation processing on the complex-value modulation symbol sequence to obtain a scrambled bit sequence.

(7) Descramble the scrambled bit sequence to obtain corresponding downlink user data.

As an optional implementation manner, in the data transmission method illustrated in FIG. 2, the downlink transmitter may receive a first upper-layer scheduling command before performing conjugate symmetric extension on the frequency domain data of the OFDM symbol in step 203, where the first upper-layer scheduling command is used to instruct the transmitter to use a VLC mode to transmit data. In other words, the downlink transmitter does not perform the LTE-over-VLC downlink transmission method of data illustrated in FIG. 2 until the first upper-layer scheduling command is received.

As an optional implementation manner, in the data transmission method illustrated in FIG. 2, the downlink transmitter may also receive a second upper-layer scheduling command that is used to instruct the transmitter to use an RF communication mode to transmit data, and therefore, after finishing performing steps 201 and 202 and obtaining the frequency domain data of the OFDM symbol, the downlink transmitter may perform IFFT and CP insertion processing on the frequency domain data of the OFDM symbol directly to form a second downlink time domain baseband signal (a complex sequence), and transmits the second downlink time domain baseband signal through a radio frequency. That is, the downlink transmitter uses an LTE-over-RF mode to transmit data. In this implementation manner, the downlink transmitter has a dual-mode downlink transmission function. That is, the downlink transmitter may select to use only an LTE-over-VLC mode to perform downlink transmission of data, and may also use only an LTE-over-RF mode to perform downlink transmission of data; or, the downlink transmitter may select to use both the LTE-over-VLC mode and the LTE-over-RF mode simultaneously to perform downlink transmission of data.

As an optional implementation manner, after performing CP insertion processing on a time domain real-number sequence to form a first downlink time domain baseband signal, the downlink transmitter may perform amplification and pre-distortion processing on the first downlink time domain baseband signal, and then loads the first downlink time domain baseband signal after amplification and pre-distortion processing onto a direct current of a LED lighting circuit to form a LED driving electrical signal.

Figure 7:
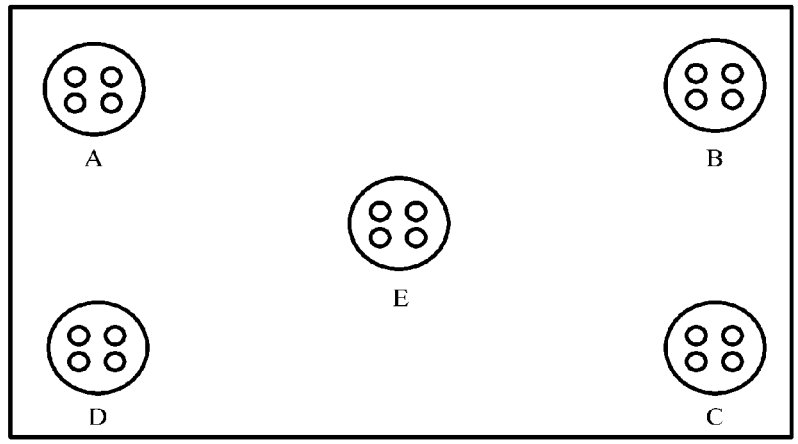
FIG. 7 is a schematic layout diagram of an indoor LED light group according to an embodiment of the present invention.

In practical application, to ensure the light intensity, generally, multiple LEDs form a group, which is called a LED light group. That is, the LED mentioned in the foregoing embodiments of the present invention may be located in any one LED light group formed by at least two LEDs. Especially, for a purpose of illumination indoors, multiple LED light groups generally need to be installed. For example, a layout of indoor LED light groups is shown in FIG. 7. 5 light groups A, B, C, D, and E are laid out indoors. The 5 LED light groups may be located at 4 corners and the middle part of the ceiling respectively, and each LED light group is formed by 4 LEDs. Because multiple LEDs emit light simultaneously, MIMO transmission based on visible light may be implemented.

Figure 8:
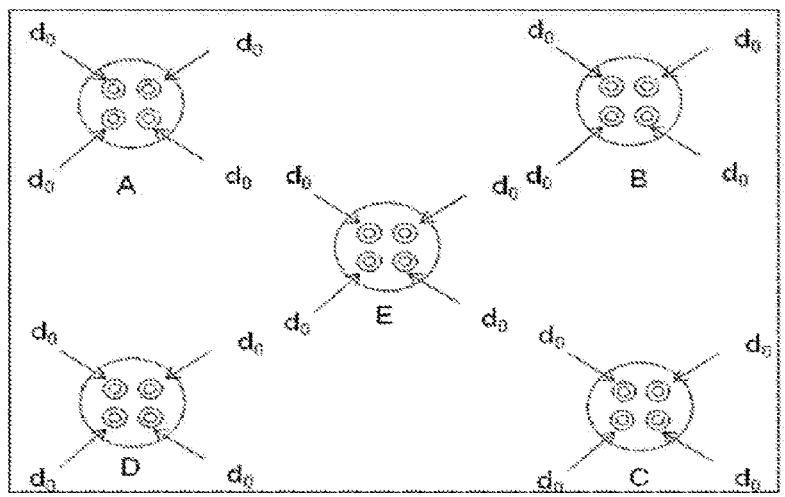
FIG. 8 is a schematic diagram of data transmission based on visible beams of the LED light group shown in FIG. 7.

For example, the LED light group layout shown in FIG. 7 is taken as an example, and a visible beam of each LED in each LED light group may transmit the same data and a visible beam of each LED light group may also transmit the same data. As shown in FIG. 8, each LED light group and visible beams of their respective LEDs transmit the same data d0, so that a diversity gain may be obtained and transmission reliability may be improved.

Figure 9:
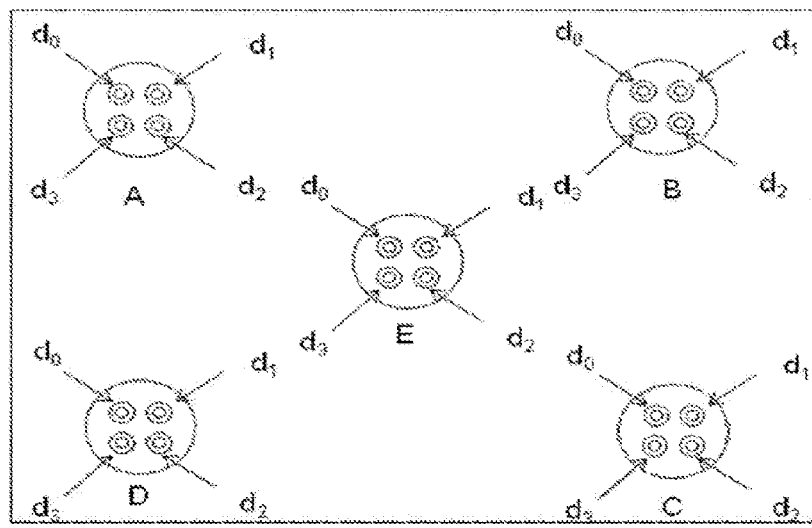
FIG. 9 is another schematic diagram of data transmission based on visible beams of the LED light group shown in FIG. 7.

Likewise, for example, the LED light group layout shown in FIG. 7 is taken as an example, a visible beam of each LED in each LED light group may transmit different data, but a visible beam of each LED light group transmits the same data. As shown in FIG. 9, 5 LED light groups transmit data d0, d1, d2, and d3 through their respective 4 LEDs, so that a diversity gain and a multiplexing gain may be obtained.

Figure 10:
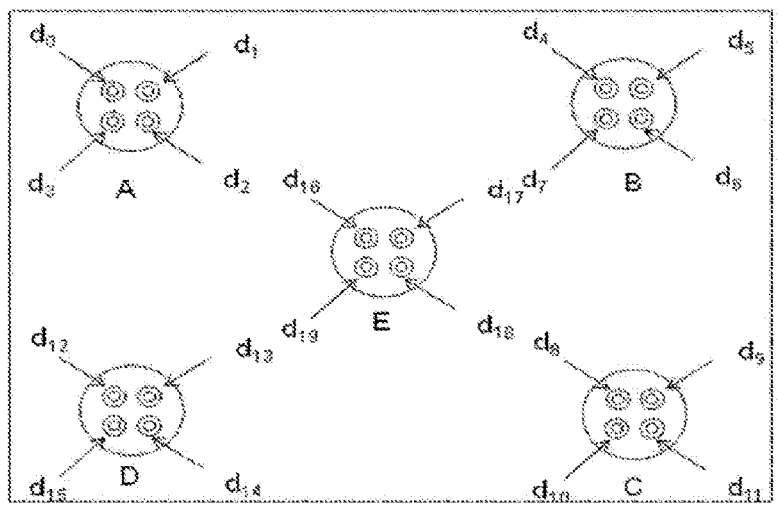
FIG. 10 is another schematic diagram of data transmission based on visible beams of the LED light group shown in FIG. 7.

Likewise, the LED light group layout shown in FIG. 7 is still taken as an example, and a visible beam of each LED in each LED light group may transmit different data, and a visible beam of each LED light group may also transmit different data. As shown in FIG. 10, 4 LEDs in a LED light group A transmit data d0, d1, d2, and d3 respectively; 4 LEDs in a LED light group B transmit data d4, d5, d6, and d7 respectively; 4 LEDs in a LED light group C transmit data d8, d9, d10, and d11 respectively; 4 LEDs in a LED light group D transmit data d12, d13, d14, and d15 respectively; and 4 LEDs in a LED light group E transmit data d16, d17, d18, and d19 respectively, so that MIMO transmission capacity of visible light may be improved.

Figure 11:
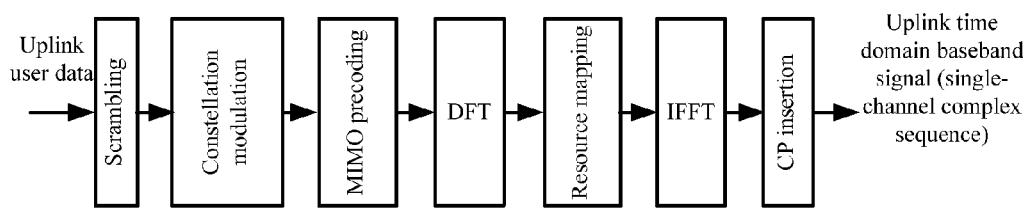
FIG. 11 is a schematic structural diagram of an LTE-over-RF uplink transmitter in the prior art.

Currently, in an uplink transmission process of LTE over RF, in an LTE system, a single-carrier frequency division multiple access (Single-carrier Frequency-Division Multiple Access, SC-FDMA) technology characterized by a low peak-to-average power ratio (Peak to average power ratio, PAPR) is adopted. FIG. 11 is a schematic structural diagram of an LTE-over-RF uplink transmitter in the prior art. After scrambling, constellation modulation, MIMO precoding, discrete Fourier transform (Discrete Fourier Transform, DFT), SC-FDMA resource mapping, IFFT, and CP insertion processing is performed sequentially on uplink user data, an uplink time domain baseband signal is obtained, and is transmitted through a radio frequency. Similarly to the downlink transmitter shown in FIG. 1, in the uplink transmitter shown in FIG. 11, a signal output after the IFFT is a complex sequence, and cannot directly drive LED visible light for communication.

Figure 12:
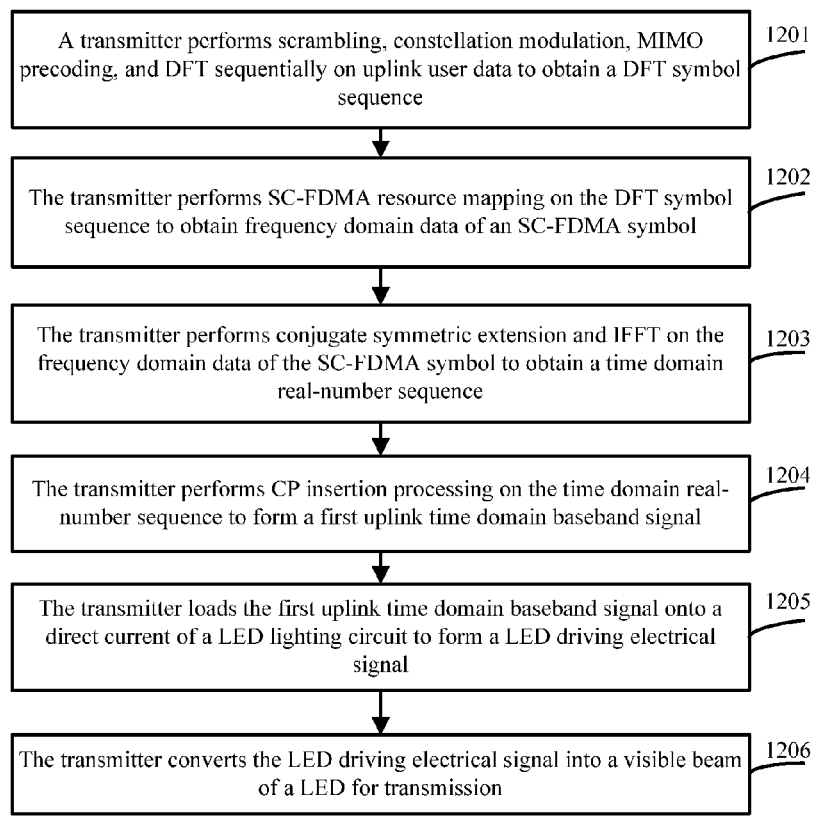
FIG. 12 is a schematic flowchart of another data transmission method according to an embodiment of the present invention.

Referring to FIG. 12, FIG. 12 is a schematic flowchart of a data transmission method according to an embodiment of the present invention. With this method, uplink transmission of data can be implemented in the case of no transmission resource restriction, no electromagnetic interference, and no radiation to the human body. As shown in FIG. 12, the data transmission method may include the following steps.

1201: A transmitter performs scrambling, constellation modulation, MIMO precoding, and DFT sequentially on uplink user data to obtain a DFT symbol sequence.

For example, the transmitter may use the following constellation modulation manners: BPSK, QPSK, 16QAM, 64QAM, and so on.

In the method illustrated in FIG. 12, the transmitter may be a mobile phone, a notebook, or another smart device, which is not limited in this embodiment of the present invention.

1202: The transmitter performs SC-FDMA resource mapping on the DFT symbol sequence to obtain frequency domain data of an SC-FDMA symbol.

The transmitter may map the DFT symbol sequence to an SC-FDMA time-frequency resource according to a resource mapping rule of different physical channels, so that frequency domain data of an SC-FDMA symbol may be obtained.

1203: The transmitter performs conjugate symmetric extension and IFFT on the frequency domain data of the SC-FDMA symbol to obtain a time domain real-number sequence.

In this embodiment of the present invention, performing the conjugate symmetric extension by the transmitter on the frequency domain data of the SC-FDMA symbol refers to adding conjugate symmetric data into the frequency domain data of the SC-FDMA symbol. IFFT is performed on the frequency domain data of the SC-FDMA symbol after the conjugate symmetric data is added, so that a time domain real-number sequence may be obtained.

1204: The transmitter performs CP insertion processing on the time domain real-number sequence to form a first uplink time domain baseband signal.

1205: The transmitter loads the first uplink time domain baseband signal onto a direct current of a LED lighting circuit to form a LED driving electrical signal.

1206: The transmitter converts the LED driving electrical signal into a visible beam of a LED for transmission.

Optionally, in the foregoing step 1205, the transmitter may also load the first uplink time domain baseband signal (a real-number sequence) onto a direct current of a fluorescent lighting circuit to form a fluorescent lamp driving electrical signal. Correspondingly, in the foregoing step 1206, the transmitter may convert the fluorescent lamp driving electrical signal into a visible beam of a fluorescent lamp for transmission.

In this embodiment of the present invention, after obtaining frequency domain data of an SC-FDMA symbol in an uplink direction, the transmitter performs conjugate symmetric extension and IFFT on the frequency domain data of the SC-FDMA symbol to obtain a time domain real-number sequence, and performs CP insertion processing to form a first uplink time domain baseband signal. The first uplink time domain baseband signal is loaded onto a direct current of a LED lighting circuit to form a LED driving electrical signal. In this way, the transmitter can convert the LED driving electrical signal into a visible beam of a LED for transmission. It can be seen that, in this embodiment of the present invention, uplink transmission of data may be implemented through visible light of a LED. Visible light transmission requires no radio spectrum license, and is free from supervision of relevant governments and organizations. Therefore, the visible light transmission is free from transmission resource restriction. Moreover, the visible light transmission is free from electromagnetic interference, and does not affect receiving performance and experience of a user, and brings no radiation to the human body.

The data transmission method illustrated in FIG. 12 is implemented based on VLC in an LTE system, namely, LTE over VLC. To better understand the data transmission method illustrated in FIG. 12, the data transmission method is described in further detail in the following with reference to a specific LTE-over-VLC uplink transmitter. Referring to FIG. 13, FIG. 13 is a schematic structural diagram of an LTE-over-VLC uplink transmitter according to an embodiment of the present invention. The uplink transmitter may be configured to implement the data transmission method illustrated in FIG. 12. In the uplink transmitter shown in FIG. 13, to minimize change of an existing LTE-over-RF uplink transmitter, an existing LTE-over-RF resource mapping manner is reused completely, and LTE-over-VLC whose signal bandwidth is W is equivalent to LTE over RF whose signal bandwidth is W/2. A specific process that the uplink transmitter shown in FIG. 13 is configured to implement the data transmission method illustrated in FIG. 12 may be as follows:

(11) Before constellation modulation is performed on a bit sequence $b(0), b(1), \ldots, b(M_{bit}-1)$ of uplink user data, the bit sequence is scrambled to generate a scrambled bit sequence $\tilde{b}(0), \tilde{b}(1), \ldots, \tilde{b}(M_{bit}-1)$.

(12) Constellation modulation is performed on the scrambled bit sequence $\tilde{b}(0), \tilde{b}(1), \ldots, \tilde{b}(M_{bit}-1)$ to generate a complex-value modulation symbol sequence $d(0), d(1), \ldots, d(M_{symb}-1)$.

Adoptable constellation modulation manners may be BPSK, QPSK, 16QAM, 64QAM, and so on. For example, if constellation modulation is performed in a QPSK manner, bits 00 may be mapped to $$\frac{1}{\sqrt{2}} + j\frac{1}{\sqrt{2}},$$

bits 01 may be mapped to $$\frac{1}{\sqrt{2}} - j\frac{1}{\sqrt{2}},$$

bits 10 may be mapped to $$-\frac{1}{\sqrt{2}} + j\frac{1}{\sqrt{2}},$$

and bits 11 may be mapped to $$-\frac{1}{\sqrt{2}} - j\frac{1}{\sqrt{2}}.$$

(13) MIMO precoding is performed on the complex-value modulation symbol sequence d(0), d(1), . . . , d($M_{symb}$−1), so that the sequence is divided into $M_{symb}/M_{sc}^{PUSCH}$ sets, where each set is corresponding to one SC-FDMA symbol, and then DFT is performed to obtain a DFT symbol sequence. The DFT may be performed by using the following formula (2):

$$z(l \cdot M_{sc}^{PUSCH} + k) = \frac{1}{\sqrt{M_{sc}^{PUSCH}}} \sum_{i=0}^{M_{sc}^{PUSCH}-1} d(l \cdot M_{sc}^{PUSCH} + i) e^{-j\frac{2\pi ik}{M_{sc}^{PUSCH}}} \quad (2)$$

$$k = 0, \ldots, M_{sc}^{PUSCH} - 1$$

$$l = 0, \ldots, M_{symb}/M_{sc}^{PUSCH} - 1$$

z(0), z(1), . . . , z($M_{symb}$−1) represents a generated DFT symbol sequence (namely, a complex-value symbol sequence), $M_{sc}^{PUSCH} = M_{RB}^{PUSCH} \cdot N_{sc}^{RB}$, $N_{sc}^{RB}$ is the number of subcarriers (Sub Carrier, SC) occupied by one resource block (Resource block, RB) in a frequency domain, $M_{RB}^{PUSCH}$ is the number of resource blocks occupied by uplink transmission of a physical uplink shared channel (Physical uplink shared channel, PUSCH), $M_{sc}^{PUSCH}$ is the number of subcarriers occupied by uplink transmission of the physical uplink shared channel (Physical uplink shared channel, PUSCH), and $M_{symb}$ represents the number of complex-value modulation symbols.

(14) According to a resource mapping rule of different physical channels, SC-FDMA resource mapping is performed on the DFT symbol sequence z(0), z(1), . . . , z($M_{symb}$−1), so that frequency domain data of an $l^{th}$ SC-FDMA symbol may be obtained, where the frequency domain data is $a_l$(0), $a_l$(1), . . . , $a_l$(N−1).

(15) Conjugate symmetric extension is performed (namely, conjugate symmetric data is added) on frequency domain data $a_l$(0), $a_l$(1), . . . , $a_l$(N−1) of each SC-FDMA symbol to form a new data sequence $b_l$(0), $b_l$(1), . . . , $b_l$(N−1), $b_l$(N) . . . , b(2N−2), b(2N−1). Correspondence between each element b and sequence a is shown in FIG. 4.

(16) IFFT is performed on the new data sequence obtained after conjugate symmetric extension (namely, adding conjugate symmetric data) is performed, to obtain a time domain real-number sequence. Formula (1) in the foregoing may be used to perform IFFT on the new data sequence obtained after conjugate symmetric extension (namely, adding conjugate symmetric data) is performed.

(17) To resist inter-symbol interference caused by multiple paths, a CP is inserted into the time domain real-number sequence after the IFFT to form a first uplink time domain baseband signal (a single-channel real-number sequence).

(18) The first uplink time domain baseband signal is loaded onto a direct current of a LED lighting circuit to form a LED driving electrical signal.

(19) The LED driving electrical signal is converted into a visible beam of a LED for transmission.

Specific implementation processes of (18) and (19) are detailed subsequently in the embodiments of the present invention with reference to specific embodiments.

The data transmission method illustrated in FIG. 12 is described in the foregoing with reference to a specific LTE-over-VLC uplink transmitter. FIG. 12 illustrates an LTE-over-VLC uplink transmission method of data. For the LTE-over-VLC uplink transmission method of data illustrated in FIG. 12, an embodiment of the present invention further provides a data processing method of an uplink receiver (which is similar to a network-side base station). As shown in FIG. 14, an implementation process of the data processing method of the uplink receiver may include the following steps.

1401: A receiver receives a visible beam of a LED and performs optical-to-electrical conversion to obtain a first uplink time domain baseband signal (a real-number sequence).

1402: The receiver performs CP removal, FFT, and conjugate symmetry removal processing on the obtained first uplink time domain baseband signal to obtain frequency domain data of an SC-FDMA symbol.

1403: The receiver performs SC-FDMA resource demapping, inverse discrete Fourier transform (Inverse Discrete Fourier Transform, IDFT), MIMO detection, channel equalization, constellation demodulation, and descrambling processing sequentially on the obtained frequency domain data of the SC-FDMA symbol to obtain uplink user data.

Figure 15:
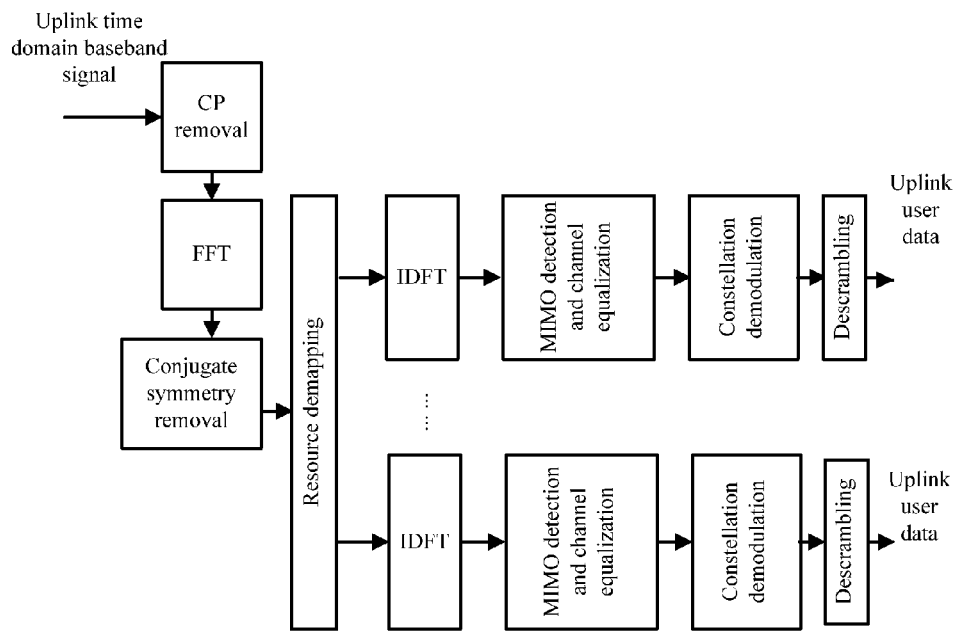
FIG. 15 is a schematic structural diagram of an LTE-over-VLC uplink receiver according to an embodiment of the present invention.

To better understand the data processing method of the receiver illustrated in FIG. 14, the data processing method is described in further detail in the following with reference to a specific LTE-over-VLC uplink receiver. Referring to FIG. 15, FIG. 15 is a schematic structural diagram of an LTE-over-VLC uplink receiver according to an embodiment of the present invention. The uplink receiver may be configured to implement the data processing method illustrated in FIG. 14. A specific process that the uplink receiver shown in FIG. 15 is configured to implement the data processing method illustrated in FIG. 14 may be as follows:

(1) After receiving a visible beam of a LED, perform optical-to-electrical conversion processing on the visible beam of the LED to obtain a first uplink time domain baseband signal, where the first uplink time domain baseband signal is a real-number sequence. Remove a CP to obtain a time domain real-number sequence.

(2) Perform FFT on the time domain real-number sequence obtained by removing the CP, to obtain a data sequence after conjugate symmetric extension.

(3) Perform conjugate symmetry removal processing on the data sequence after conjugate symmetric extension to obtain frequency domain data of an SC-FDMA symbol.

(4) According to a resource mapping rule of different physical channels, perform SC-FDMA resource demapping processing on the frequency domain data of the SC-FDMA symbol by using a corresponding resource demapping manner to obtain a DFT symbol sequence.

(5) Perform IDFT, MIMO detection, and channel equalization processing on the DFT symbol sequence to obtain a complex-value modulation symbol sequence that undergoes constellation modulation.

(6) Perform constellation demodulation processing on the complex-value modulation symbol sequence to obtain a scrambled bit sequence.

(7) Descramble the scrambled bit sequence to obtain corresponding uplink user data.

As an optional implementation manner, in the data transmission method illustrated in FIG. 12, the uplink transmitter may receive a first upper-layer scheduling command before performing conjugate symmetric extension on the frequency domain data of the SC-FDMA symbol in step 1203, where the first upper-layer scheduling command is used to instruct the transmitter to use a VLC mode to transmit data. In other words, the uplink transmitter does not perform the LTE-over-VLC uplink transmission method of data illustrated in FIG. 12 until the first upper-layer scheduling command is received.

As an optional implementation manner, in the data transmission method illustrated in FIG. 12, the uplink transmitter may also receive a second upper-layer scheduling command that is used to instruct the transmitter to use an RF communication mode to transmit data, and therefore, after finishing performing steps 1201 and 1202 and obtaining the frequency domain data of the SC-FDMA symbol, the uplink transmitter may perform IFFT and CP insertion processing on the frequency domain data of the SC-FDMA symbol directly to form a second uplink time domain baseband signal (a complex sequence), and transmits the second uplink time domain baseband signal through a radio frequency. That is, the uplink transmitter uses an LTE-over-RF mode to perform uplink transmission of data. In this implementation manner, the uplink transmitter has a dual-mode uplink transmission function. That is, the uplink transmitter may select to use only an LTE-over-VLC mode to perform uplink transmission of data, and may also use only an LTE-over-RF mode to perform uplink transmission of data; or, the uplink transmitter may select to use both the LTE-over-VLC mode and the LTE-over-RF mode simultaneously to perform uplink transmission of data.

As described in the foregoing, in a downlink transmission direction, a downlink transmitter may perform downlink transmission of data by using an LTE-over-VLC mode as instructed by a first upper-layer scheduling command, or by using an LTE-over-RF mode as instructed by a second upper-layer scheduling command, which is described in the following with reference to specific embodiments.

Figure 16:
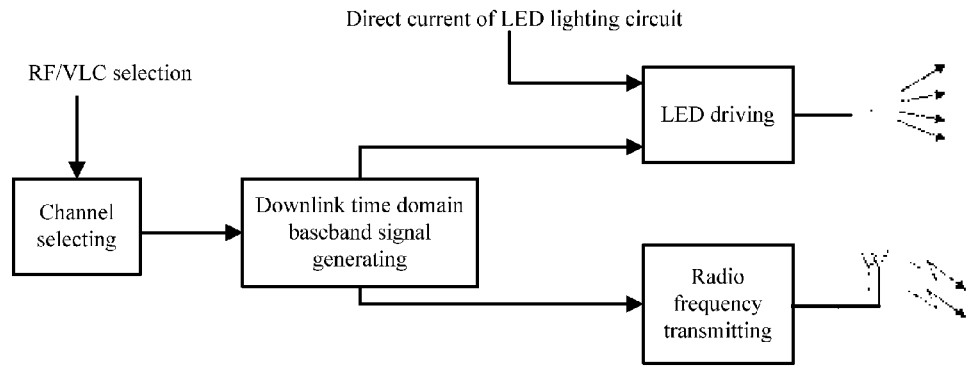
FIG. 16 is a schematic structural diagram of another downlink transmitter according to an embodiment of the present invention.

Referring to FIG. 16, FIG. 16 is a schematic structural diagram of a downlink transmitter according to an embodiment of the present invention. The downlink transmitter may use an LTE-over-RF mode or an LTE-over-VLC mode to perform downlink transmission of data. As shown in FIG. 16, the downlink transmitter may be disposed with the following modules.

A channel selecting module is configured to receive a first upper-layer scheduling command or a second upper-layer scheduling command A downlink time domain baseband signal generating module is configured to: when the channel selecting module receives the first upper-layer scheduling command, generate, according to a procedure shown in FIG. 3, a first downlink time domain baseband signal, and at this time, the first downlink time domain baseband signal is a real-number sequence and is input into a LED driving module; or when the channel selecting module receives the second upper-layer scheduling command, generate, according to a procedure shown in FIG. 1, a second downlink time domain baseband signal, and at this time, the second downlink time domain baseband signal is a complex sequence and is input into a radio frequency transmitting module.

As an optional implementation manner, at the same time when inputting the first downlink time domain baseband signal that is a real-number sequence into the LED driving module, the downlink time domain baseband signal generating module may input some predefined pilot signals or synchronization signals into the radio frequency transmitting module, so that a user performs radio frequency channel detection and fast switching.

Likewise, as an optional implementation manner, at the same time when inputting the second downlink time domain baseband signal that is a complex sequence into the radio frequency transmitting module, the downlink time domain baseband signal generating module may input some predefined pilot signals or synchronization signals into the LED driving module, so that a user performs VLC channel detection and fast switching.

What are input into the LED driving module are a direct current of a LED lighting circuit and the first downlink time domain baseband signal (a real-number sequence) that is input by the downlink time domain baseband signal generating module. The LED driving module may perform amplification and pre-distortion processing on the first downlink time domain baseband signal, and then load the first downlink time domain baseband signal onto the direct current of the LED lighting circuit to form a LED driving electrical signal, and output the LED driving electrical signal to a LED module.

A specific structure of the LED driving module is described in detail subsequently in this embodiment of the present invention.

What is input into the LED module is the LED driving electrical signal output by the LED driving module. The LED module converts the LED driving electrical signal into a visible beam of a LED for transmission. That is, the LED not only provides lighting, but also serves as a transmitting antenna of an LTE downlink channel.

In this embodiment of the present invention, the LED driving module may collaborate with the LED module to implement the foregoing steps (8) and (9) illustrated in FIG. 3.

The radio frequency transmitting module is configured to transmit the second downlink time domain baseband signal (a complex sequence) directly through a radio frequency, where the second downlink time domain baseband signal is input by the downlink time domain baseband signal generating module.

Figure 17:
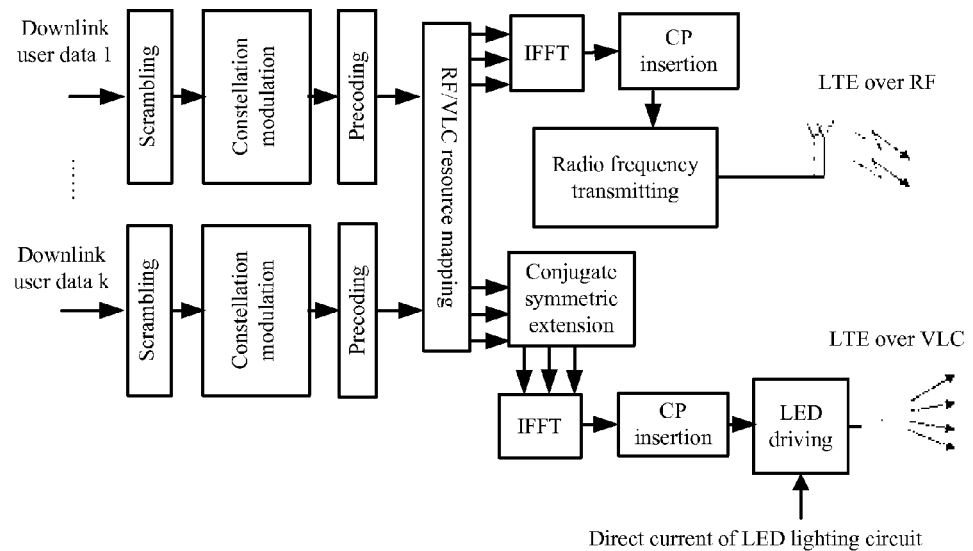
FIG. 17 is a detail diagram of the downlink transmitter shown in FIG. 16.

In this embodiment of the present invention, the downlink transmitter illustrated in FIG. 16 may further be decomposed into a structure shown in FIG. 17. A downlink transmitter shown in FIG. 17 may be regarded as an optimized combination of the downlink transmitters shown in FIG. 1 and FIG. 3. In the downlink transmitter shown in FIG. 17, the following modules need to be added or modified:

1. RF/VLC Resource Mapping Module

In a conventional LTE system, a resource mapping module maps only data to an OFDM time-frequency resource in an RF mode. In this embodiment of the present invention, the downlink transmitter may perform downlink transmission of data by selecting an LTE-over-RF mode according to a first upper-layer scheduling command, or by selecting an LTE-over-RF mode according to a second upper-layer scheduling command. If the downlink transmitter receives the first upper-layer scheduling command, the RF/VLC resource mapping module maps a precoded symbol sequence obtained after MIMO precoding to an OFDM time-frequency resource in an LTE-over-VLC mode, and executes a subsequent procedure in the LTE-over-VLC mode; and if the downlink transmitter receives the second upper-layer scheduling command, the RF/VLC resource mapping module maps a precoded symbol sequence obtained after MIMO precoding to an OFDM time-frequency resource in the LTE-over-RF mode, and executes a subsequent procedure in the LTE-over-RF mode. Compared with a conventional resource mapping module, this module has an additional function of transmission mode (RF/VLC) adaptation. The number of valid subcarriers (namely, the number of subcarriers that may be used for loading signals) may be different in the two modes. For the LTE-over-RF mode, the number of valid subcarriers is equal to the number of subcarriers of an OFDM time-frequency resource; and for the LTE-over-VLC mode, the number of valid subcarriers is equal to a half of the number of subcarriers of the OFDM time-frequency resource. For example, in the LTE-over-VLC mode, an OFDM time-frequency resource that includes 2048 subcarriers has 1024 valid subcarriers, because in the LTE-over-VLC mode, it is required that signals on subcarriers should be conjugate-symmetric. As a result, a half of the subcarriers are not available.

A method used by this module for mapping the precoded symbol sequence to an OFDM time-frequency resource in the LTE-over-VLC mode is consistent with the method used for mapping the precoded symbol sequence to an OFDM time-frequency resource that includes an equal number of valid subcarriers and is in the LTE-over-RF mode. For example, a method for mapping the precoded symbol sequence to an OFDM time-frequency resource that includes 1024 valid subcarriers (actually, includes 2048 subcarriers) and is in the LTE-over-VLC mode inclusive is consistent with a method for mapping the precoded symbol sequence to an OFDM time-frequency resource that includes 1024 valid subcarriers and is in the LTE-over-RF mode. Therefore, the resource mapping module (LTE-over-RF mode) in the conventional LTE system may be reused, so that a new resource mapping module does not need to be redesigned.

2. Conjugate Symmetric Extending Module

Figure 18:
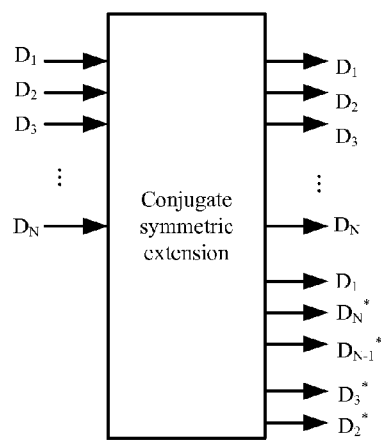
FIG. 18 is a schematic diagram of conjugate symmetric extension performed on a precoded symbol sequence.

This module is configured to perform conjugate symmetric extension on precoded symbol sequences that are input in parallel. As shown in FIG. 18, $D_1, D_2, D_3, \ldots, D_N$ are marked as N precoded symbol sequences (arranged from high frequencies to low frequencies) that are input in parallel, and therefore, $D_1, D_2, D_3, \ldots, D_N$ are conjugate-symmetrically extended to 2N parallel symbol sequences $D_1, D_2, D_3, \ldots, D_N, D_1, D^*_N, D^*_{N-1}, \ldots, D^*_2$. A first symbol corresponds to a direct current (DC) subcarrier. Generally, the DC subcarrier is not used to transmit a signal, namely, $D_1=0$.

In the downlink transmitter shown in FIG. 17, the conjugate symmetric extending module may be combined with a subsequent IFFT module to optimize design, thereby reducing calculation complexity, which is not restricted in this embodiment of the present invention.

Figure 19:
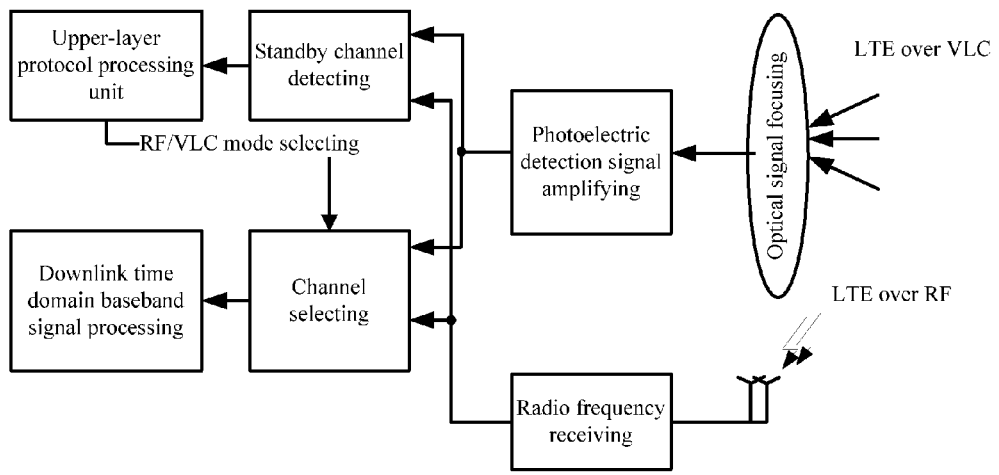
FIG. 19 is a schematic structural diagram of another downlink receiver according to an embodiment of the present invention.

Correspondingly, in this embodiment of the present invention, in a downlink transmission direction, a downlink receiver may also receive downlink transmitted data through an LTE-over-RF mode or LTE-over-VLC mode. The downlink receiver may receive downlink transmitted data by using the same mode as the downlink transmitter does. Referring to FIG. 19, FIG. 19 is a schematic structural diagram of another downlink receiver according to an embodiment of the present invention. The downlink receiver may receive downlink transmitted data through an LTE-over-RF mode or LTE-over-VLC mode. As shown in FIG. 19, the downlink receiver may be disposed with the following modules:

1. Optical Signal Focusing Module

The optical signal focusing module is configured to focus a visible beam (namely, an optical signal) of a LED onto a photoelectric detection device to improve intensity of received visible light of the LED. Generally, the module is made up of an optical lens.

2. Photoelectric Detection Signal Amplifying Module

This module is mainly configured to convert input visible light of the LED into an electrical signal to obtain a first downlink time domain baseband signal (a real-number sequence), and perform pre-distortion compensation and signal amplification processing.

3. Radio Frequency Receiving Module

This module is mainly configured to receive, through an LTE-over-RF mode, a second downlink time domain baseband signal (a complex sequence) transmitted by a transmitter.

4 Channel Selecting Module

This module is mainly configured to select an LTE-over-RF mode or an LTE-over-VLC mode according to an upper-layer scheduling command to receive the visible light of the LED (namely, downlink transmitted data), and output the visible light to a downlink time domain baseband signal processing module.

5. Downlink Time Domain Baseband Signal Processing Module

If the channel selecting module receives a second upper-layer scheduling command, the downlink time domain baseband signal processing module may perform, according to a conventional LTE downlink data processing method, CP removal, FFT, resource demapping, MIMO detection, channel equalization, constellation demodulation, and descrambling processing sequentially on the second downlink time domain baseband signal (a complex sequence) output by the radio frequency receiving module, to obtain downlink user data.

If the channel selecting module receives a first upper-layer scheduling command, the downlink time domain baseband signal processing module may perform, according to the method shown in FIG. 5, CP removal, FFT, conjugate symmetry removal, resource demapping, MIMO detection, channel equalization, constellation demodulation, and descrambling processing sequentially on the first downlink time domain baseband signal (a real-number sequence) output by the photoelectric detection signal amplifying module, to obtain downlink user data.

6. Standby Channel Detecting Module (Optional)

This module is mainly configured to feed back channel quality of a standby channel to an upper-layer protocol processing unit, so that a system selects a transmission mode. For example, if a downlink transmitter performs downlink transmission of data by using an LTE-over-RF mode, this module detects quality of a VLC channel in a signal output by the photoelectric detection signal amplifying module, and feeds back a result to an upper-layer protocol processing unit; and if the downlink transmitter performs downlink transmission of data by using an LTE-over-VLC mode, this module detects quality of an RF channel in a signal output by the radio frequency receiving module, and feeds back a result to the upper-layer protocol processing unit.

Figure 20:
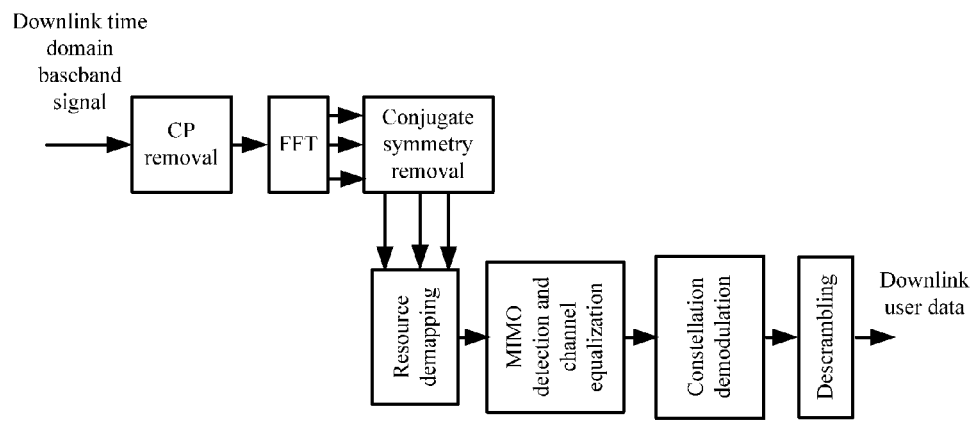
FIG. 20 is a schematic diagram of a downlink time domain baseband signal processing module in the downlink receiver shown in FIG. 19.

In the downlink receiver shown in FIG. 19, the downlink time domain baseband signal processing module may further be decomposed, as shown in FIG. 20. When the channel selecting module receives the first upper-layer scheduling command, a processing process of the downlink time domain baseband signal processing module is the same as that described in FIG. 6, that is, performing CP removal, FFT, conjugate symmetry removal, resource demapping, MIMO detection, channel equalization, constellation demodulation, and descrambling processing sequentially on the first downlink time domain baseband signal (a real-number sequence) output by the photoelectric detection signal amplifying module, to obtain corresponding downlink user data.

When the channel selecting module receives the second upper-layer scheduling command, a processing process of the downlink time domain baseband signal processing module is: performing CP removal, FFT, resource demapping, MIMO detection, channel equalization, constellation demodulation, and descrambling processing sequentially on the second downlink time domain baseband signal (a complex sequence) output by the radio frequency receiving module, to obtain corresponding downlink user data. That is, when the channel selecting module receives the second upper-layer scheduling command, a conjugate symmetry removing module in FIG. 20 does not work, and a signal is transmitted transparently to an OFDM resource demapping module for processing.

As described in the foregoing, the transmitter may use both the LTE-over-VLC mode and the LTE-over-RF mode simultaneously to perform downlink transmission of data and implement dual-mode downlink transmission. The transmitter may regard LTE-over-VLC transmission as equivalent to an independent frequency point in carrier aggregation, thereby reusing existing modules in a conventional LTE system as much as possible and reducing an impact on an existing LTE standard. The following is described with reference to specific embodiments.

Figure 21:
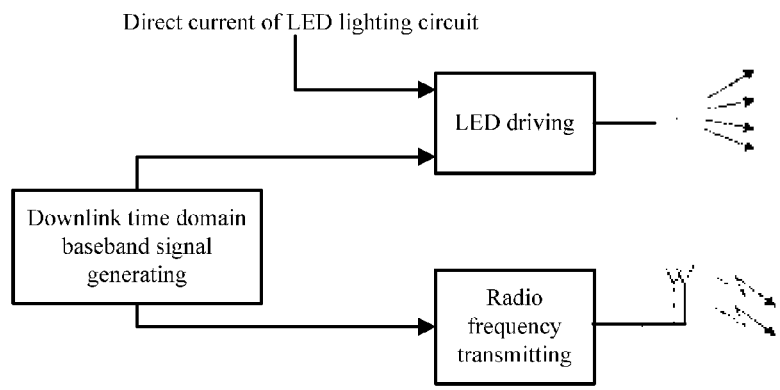
FIG. 21 is a schematic structural diagram of another downlink transmitter according to an embodiment of the present invention.

Referring to FIG. 21, FIG. 21 is a schematic structural diagram of another downlink transmitter according to an embodiment of the present invention. The downlink transmitter may use both an LTE-over-RF mode and an LTE-over-VLC mode simultaneously to perform downlink transmission of data and implement dual-mode downlink transmission. As shown in FIG. 21, a structure of the downlink transmitter is similar to a structure of the downlink transmitter shown in FIG. 16 except that a channel selecting module is omitted. In the downlink transmitter shown in FIG. 21, a downlink time domain baseband signal generating module may simultaneously generate, according to processes shown in FIG. 1 and FIG. 3, a second downlink time domain baseband signal that is a complex sequence and generate a first downlink time domain baseband signal that is a real-number sequence; and directly transmit, through a radio frequency, the second downlink time domain baseband signal that is a complex sequence, but transmit, through visible light of a LED, the first downlink time domain baseband signal that is a real-number sequence.

As an optional implementation manner, in this embodiment of the present invention, when the downlink transmitter uses both the LTE-over-RF mode and the LTE-over-VLC mode simultaneously to perform downlink transmission of data, the downlink transmitter may generate, from the same channel of downlink user data, a second downlink time domain baseband signal (a complex sequence) and a first downlink time domain baseband signal (a real-number sequence) respectively, transmit the second downlink time domain baseband signal (a complex sequence) through a radio frequency directly, but transmit the first downlink time domain baseband signal (a real-number sequence) through visible light of a LED.

As another optional implementation manner, in this embodiment of the present invention, when the downlink transmitter uses both the LTE-over-RF mode and the LTE-over-VLC mode simultaneously to perform downlink transmission of data, the downlink transmitter may generate a second downlink time domain baseband signal (a complex sequence) from a part of multiple channels of downlink user data and generate a first downlink time domain baseband signal (a real-number sequence) from the remaining part of the downlink user data, transmit the second downlink time domain baseband signal (a complex sequence) through a radio frequency directly, but transmit the first downlink time domain baseband signal (a real-number sequence) through visible light of a LED.

Figure 22:
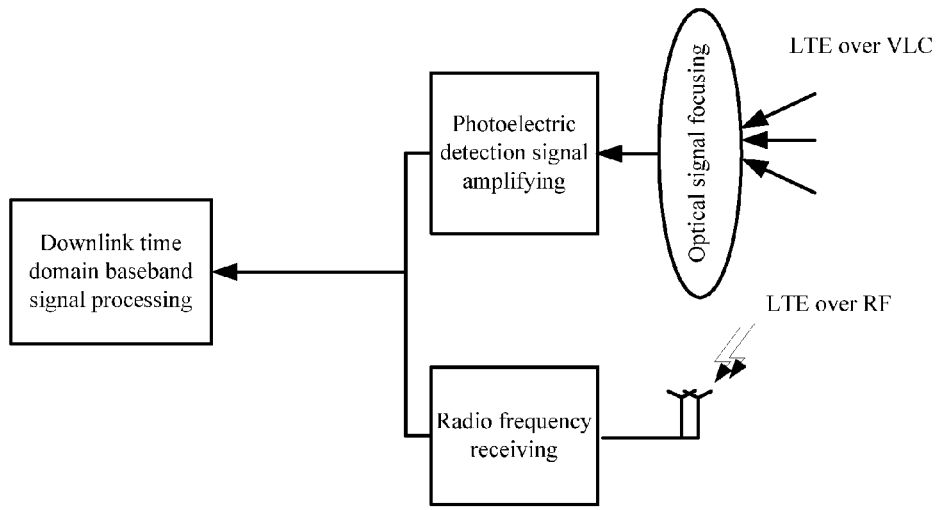
FIG. 22 is a schematic structural diagram of another downlink receiver according to an embodiment of the present invention.
Figure 23:
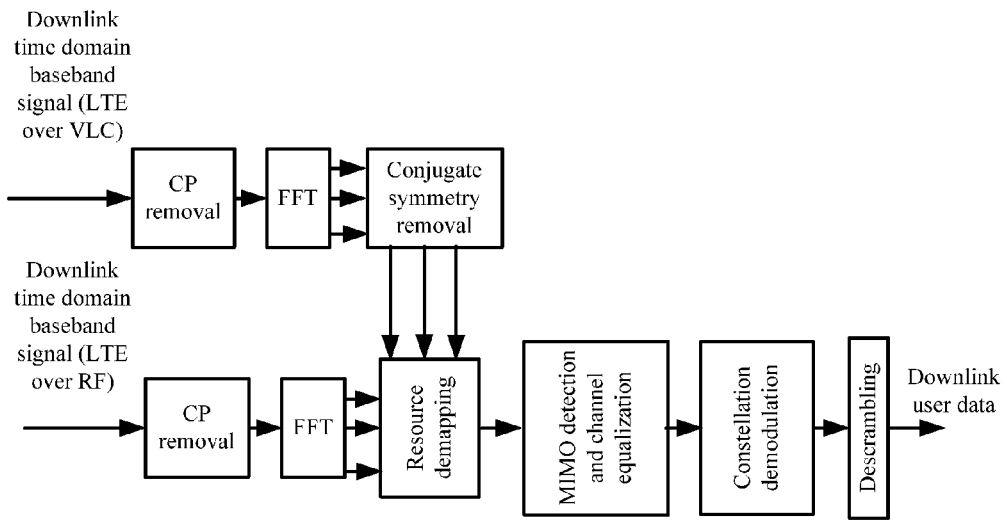
FIG. 23 is a detail diagram of a downlink time domain baseband signal processing module in the downlink receiver shown in FIG. 22.

Corresponding to the downlink transmitter shown in FIG. 21, in this embodiment of the present invention, in a downlink transmission direction, a downlink receiver may also use both an LTE-over-RF mode and an LTE-over-VLC mode simultaneously to receive downlink transmitted data. Referring to FIG. 22, FIG. 22 is a schematic structural diagram of another downlink receiver according to an embodiment of the present invention. The downlink receiver may use an LTE-over-RF mode and an LTE-over-VLC mode simultaneously to receive downlink transmitted data. In the downlink receiver shown in FIG. 22, a function of a photoelectric detection signal amplifying module is the same as a function of the photoelectric detection signal amplifying module shown in FIG. 19; and a function of a radio frequency receiving module is the same as a function of the radio frequency receiving module shown in FIG. 19. In this embodiment of the present invention, a downlink time domain baseband signal processing module in the downlink receiver shown in FIG. 22 may further be decomposed, as shown in FIG. 23, and may perform CP removal, FFT, conjugate symmetry removal, resource demapping, MIMO detection, channel equalization, constellation demodulation, and descrambling processing sequentially on a first downlink time domain baseband signal (a real-number sequence) output by the photoelectric detection signal amplifying module, to obtain corresponding downlink user data; and perform CP removal, FFT, resource demapping, MIMO detection, channel equalization, constellation demodulation, and descrambling processing sequentially on a second downlink time domain baseband signal (a complex sequence) output by the radio frequency receiving module, to obtain corresponding downlink user data.

As described in the foregoing, in an uplink transmission direction, an uplink transmitter may perform uplink transmission of data by using an LTE-over-VLC mode as instructed by a first upper-layer scheduling command, or by using an LTE-over-RF mode as instructed by a second upper-layer scheduling command. The following is described with reference to specific embodiments.

Figure 24:
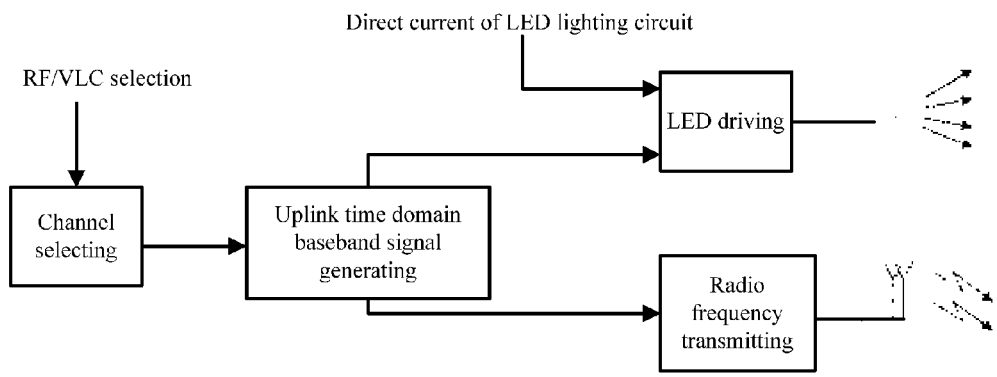
FIG. 24 is a schematic structural diagram of an uplink transmitter according to an embodiment of the present invention.
Figure 25:
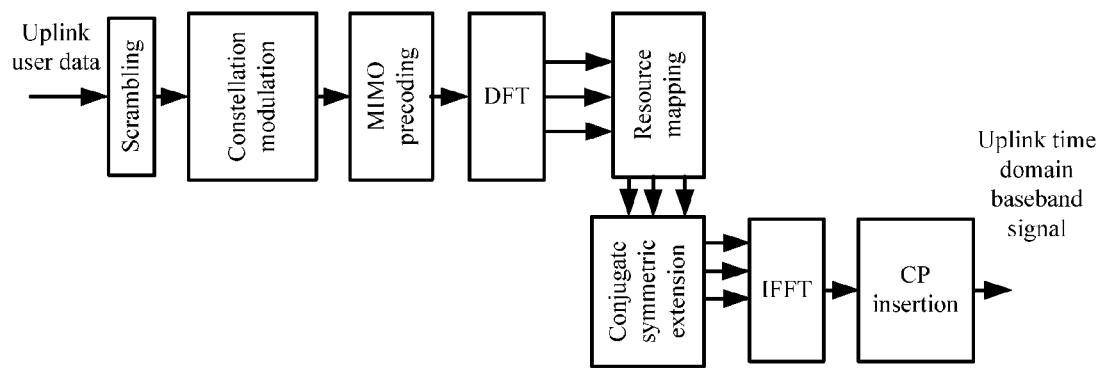
FIG. 25 is a detail diagram of an uplink time domain baseband signal generating module in the uplink transmitter shown in FIG. 24.

Referring to FIG. 24, FIG. 24 is a schematic structural diagram of an uplink transmitter according to an embodiment of the present invention. The uplink transmitter may use an LTE-over-RF mode or LTE-over-VLC mode to perform uplink transmission of data. A structure of the uplink transmitter shown in FIG. 24 is similar to a structure of the downlink transmitter shown in FIG. 16 except that in the uplink transmitter shown in FIG. 24, an uplink time domain baseband signal generating module may be decomposed as shown in FIG. 25. As shown in FIG. 25, when a channel selecting module receives a first upper-layer scheduling command, the uplink time domain baseband signal generating module may perform scrambling, constellation modulation, MIMO precoding, DFT, SC-FDMA resource mapping, conjugate symmetric extension, IFFT, and CP insertion respectively on uplink user data to form a first uplink time domain baseband signal (a real-number sequence), and transmit the first uplink time domain baseband signal through visible light of a LED. When the channel selecting module receives a second upper-layer scheduling command, the uplink time domain baseband signal generating module may perform scrambling, constellation modulation, MIMO precoding, DFT, SC-FDMA resource mapping, IFFT, and CP insertion respectively on uplink user data to form a second uplink time domain baseband signal (a complex sequence), and transmit the second uplink time domain baseband signal through a radio frequency. That is, when the channel selecting module receives the second upper-layer scheduling command, a conjugate symmetric extending module in the uplink time domain baseband signal generating module does not work.

In the uplink transmitter shown in FIG. 24, a LED driving module may collaborate with a LED light to implement the foregoing steps (18) and (19).

Figure 26:
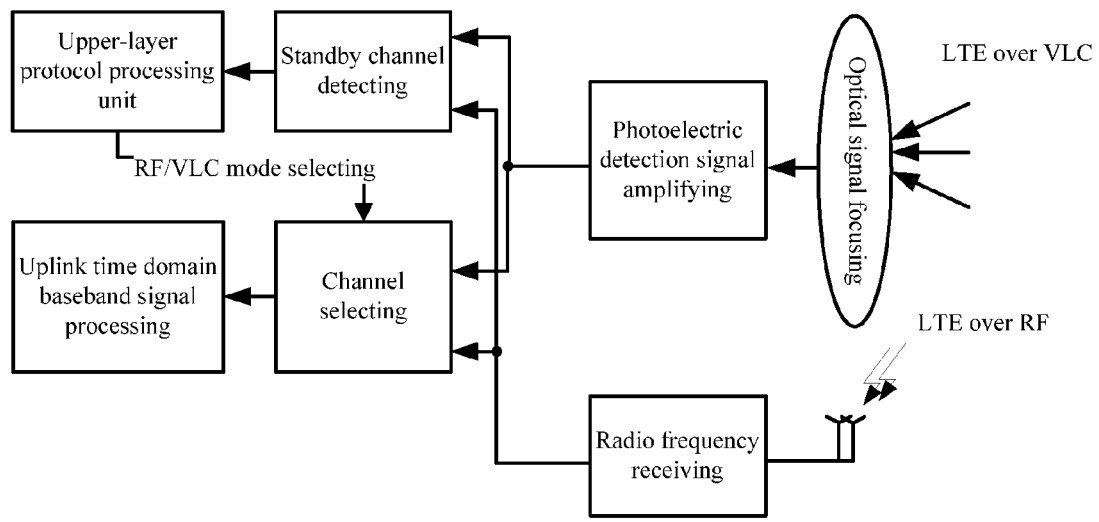
FIG. 26 is a schematic structural diagram of another uplink receiver according to an embodiment of the present invention.

Corresponding to the uplink transmitter shown in FIG. 24, in this embodiment of the present invention, in an uplink transmission direction, an uplink receiver may also receive uplink transmitted data through an LTE-over-RF mode or an LTE-over-VLC mode. The uplink receiver may receive uplink transmitted data by using the same mode as the uplink transmitter does. Referring to FIG. 26, FIG. 26 is a schematic structural diagram of another uplink receiver according to an embodiment of the present invention. A structure of the uplink receiver shown in FIG. 26 is similar to a structure of the downlink receiver shown in FIG. 19 except that, when a channel selecting module of the uplink receiver receives a first upper-layer scheduling command, an uplink time domain baseband signal processing module may perform CP removal, FFT, conjugate symmetry removal, SC-FDMA resource mapping, IDFT, MIMO detection, channel equalization, constellation demodulation, and descrambling processing sequentially on a first uplink time domain baseband signal (a real-number sequence) output by a photoelectric detection signal amplifying module, to obtain uplink user data; and when the channel selecting module of the uplink receiver receives a second upper-layer scheduling command, the uplink time domain baseband signal processing module may perform CP removal, FFT, SC-FDMA resource mapping, IDFT, MIMO detection, channel equalization, constellation demodulation, and descrambling processing sequentially on a second uplink time domain baseband signal (a complex sequence) output by a radio frequency receiving module, to obtain uplink user data.

Figure 27:
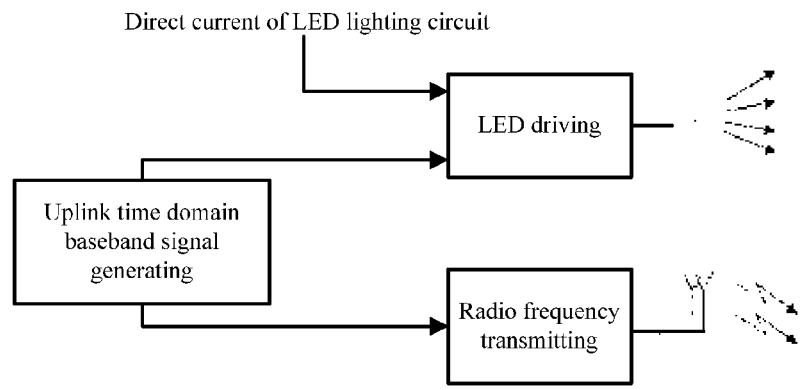
FIG. 27 is a schematic structural diagram of another uplink transmitter according to an embodiment of the present invention.

As described in the foregoing, the uplink transmitter may use both the LTE-over-VLC mode and the LTE-over-RF mode simultaneously to perform uplink transmission of data and implement dual-mode uplink transmission. As shown in FIG. 27, a structure of an uplink transmitter that may use both an LTE-over-VLC mode and an LTE-over-RF mode simultaneously to perform uplink transmission of data is similar to a structure of the downlink transmitter shown in FIG. 21. A difference is that, in the uplink transmitter shown in FIG. 27, an uplink time domain baseband signal generating module may perform scrambling, constellation modulation, MIMO precoding, DFT, SC-FDMA resource mapping, conjugate symmetric extension, IFFT, and CP insertion respectively on uplink user data to form a first uplink time domain baseband signal (a real-number sequence), and transmit the first uplink time domain baseband signal through visible light of a LED; and perform scrambling, constellation modulation, MIMO precoding, DFT, SC-FDMA resource mapping, IFFT, and CP insertion respectively on uplink user data to form a second uplink time domain baseband signal (a complex sequence), and transmit the second uplink time domain baseband signal through a radio frequency.

As an optional implementation manner, in this embodiment of the present invention, when the uplink transmitter uses both the LTE-over-RF mode and the LTE-over-VLC mode simultaneously to perform uplink transmission of data, the uplink transmitter may generate, from the same channel of uplink user data, a second uplink time domain baseband signal (a complex sequence) and a first uplink time domain baseband signal (a real-number sequence) respectively, transmit the second uplink time domain baseband signal (a complex sequence) through a radio frequency directly, but transmit the first uplink time domain baseband signal (a real-number sequence) through visible light of a LED.

Figure 28:
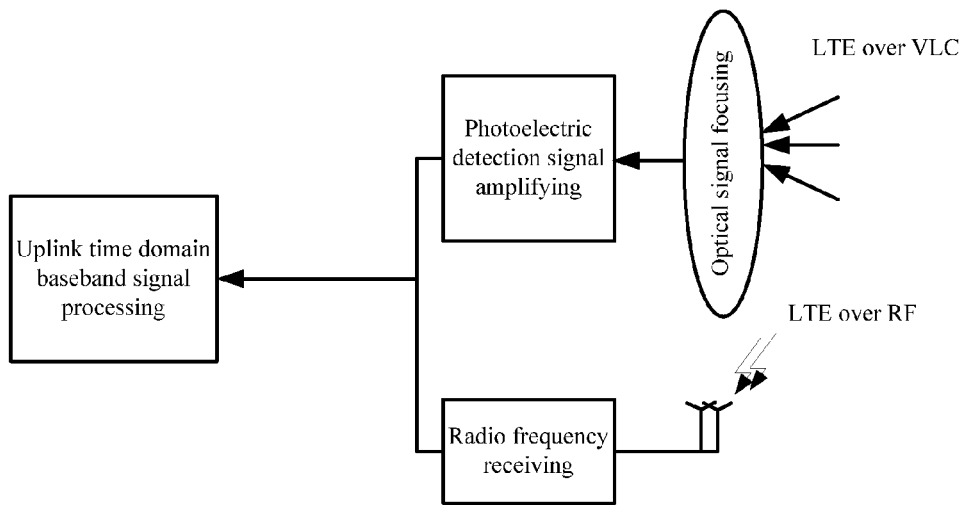
FIG. 28 is a schematic structural diagram of another uplink receiver according to an embodiment of the present invention.

Corresponding to the uplink transmitter shown in FIG. 27, in this embodiment of the present invention, in an uplink transmission direction, an uplink receiver may also use both an LTE-over-RF mode and an LTE-over-VLC mode simultaneously to receive downlink transmitted data, as shown in FIG. 28. A structure of an uplink receiver shown in FIG. 28 is similar to a structure of the downlink receiver shown in FIG. 22. A difference is that, in the uplink receiver shown in FIG. 28, an uplink time domain baseband signal processing module may perform CP removal, FFT, conjugate symmetry removal, SC-FDMA resource mapping, IDFT, MIMO detection, channel equalization, constellation demodulation, and descrambling processing sequentially on a first uplink time domain baseband signal (a real-number sequence) output by a photoelectric detection signal amplifying module, to obtain uplink user data; and perform CP removal, FFT, SC-FDMA resource mapping, IDFT, MIMO detection, channel equalization, constellation demodulation, and descrambling processing sequentially on a second uplink time domain baseband signal (a complex sequence) output by a radio frequency receiving module, to obtain uplink user data; and implement dual-mode uplink receiving.

Figure 29:
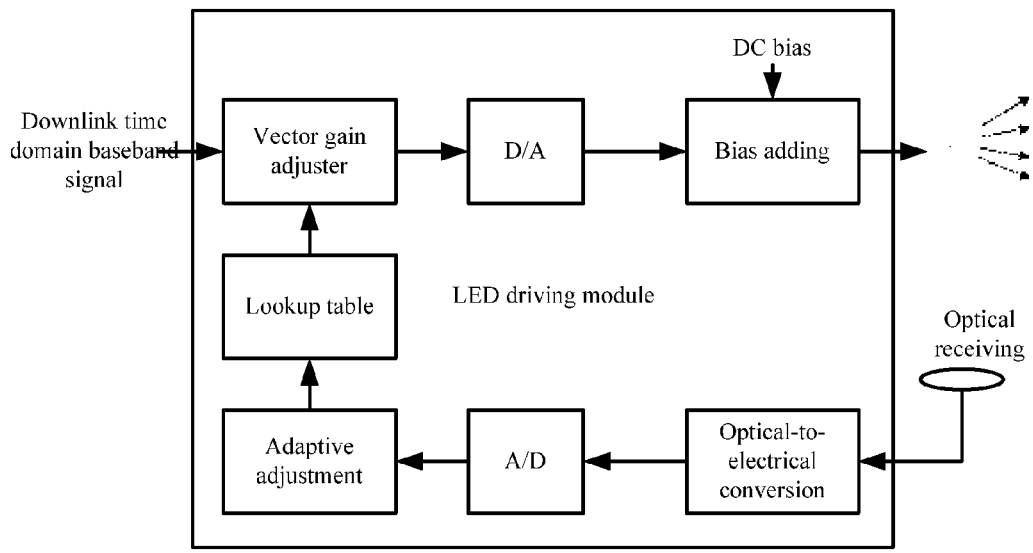
FIG. 29 is a schematic structural diagram of a LED driving module according to an embodiment of the present invention.

In the following, the LED driving module introduced in the foregoing is described in an embodiment of the present invention. The following describes in detail. An embodiment of the present invention provides a LED driving module, and its structure is shown in FIG. 29. In an LTE-over-RF mode, a vector gain adjuster in the LED driving module is mainly configured to correct a nonlinear gain of a radio frequency power amplifier. In an LTE-over-VLC mode, the LED driving module needs to convert an electrical signal into an optical signal. Generally, conversion is not completely linear. Therefore, a DPD (Digital Pre-Distortion) needs to be added in front of an electrical-to-optical converting module to increase intensity of an optical signal. In this embodiment of the present invention, the DPD may reuse a DPD of a radio frequency if the following modifications are made:

1. an adaptive adjusting module, which needs to adjust only amplitude, but does not need to adjust phase; and 2. a lookup table, which needs to store only adjustment information of amplitude, but does not need to store adjustment information of phase.

In addition, to ensure that the DPD can work properly, an optical signal receiver (such as the optical signal focusing module mentioned in the foregoing) may be installed on a transmitter. An optical signal received by the receiver undergoes optical-to-electrical conversion and then is input into the DPD to generate adjustment information of signal amplitude.

The data transmission method provided in the embodiments of the present invention is described clearly and completely in the foregoing. In the embodiments of the present invention, after obtaining frequency domain data of an OFDM symbol in a downlink direction, the transmitter performs conjugate symmetric extension and IFFT on the frequency domain data of the OFDM symbol, so that a time domain real-number sequence may be obtained; and performs CP insertion processing to form a first downlink time domain baseband signal. The first downlink time domain baseband signal is loaded onto a direct current of a LED lighting circuit to form a LED driving electrical signal. In this way, the transmitter can convert the LED driving electrical signal into a visible beam of a LED for transmission. In addition, in the embodiments of the present invention, after obtaining frequency domain data of an SC-FDMA symbol in an uplink direction, the transmitter performs conjugate symmetric extension and IFFT on the frequency domain data of the SC-FDMA symbol, so that a time domain real-number sequence may be obtained; and performs CP insertion processing to form a first uplink time domain baseband signal. The first uplink time domain baseband signal is loaded onto a direct current of a LED lighting circuit to form a LED driving electrical signal. In this way, the transmitter can convert the LED driving electrical signal into a visible beam of a LED for transmission. It can be seen that, in the embodiments of the present invention, data transmission may be implemented through visible light of a LED. Visible light transmission requires no radio spectrum license, and is free from supervision of relevant governments and organizations. Therefore, the visible light transmission is free from transmission resource restriction. Moreover, the visible light transmission is free from electromagnetic interference, does not affect receiving performance and experience of a user, and brings no radiation to the human body.

Figure 30:
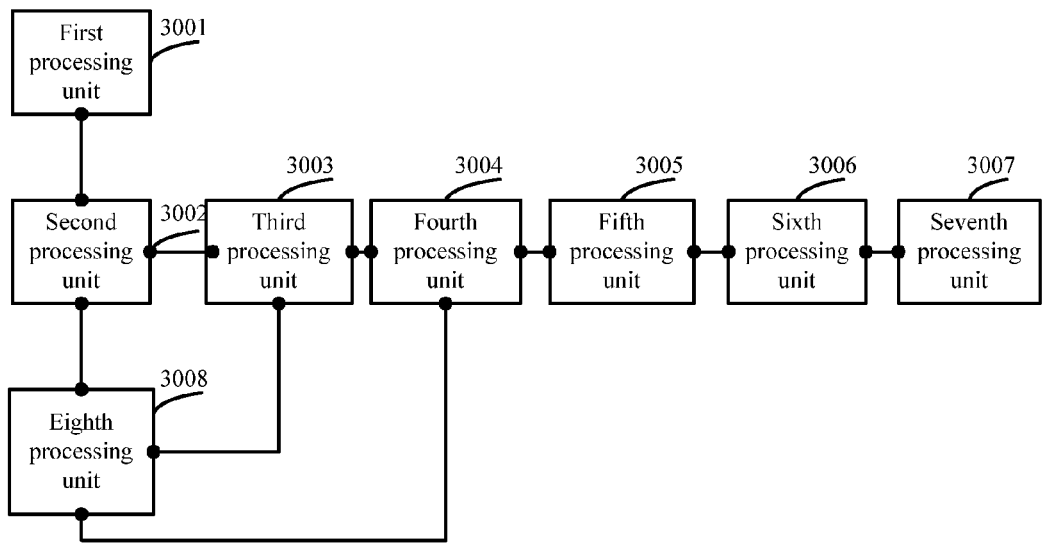
FIG. 30 is a schematic structural diagram of a transmitter according to an embodiment of the present invention.

Referring to FIG. 30, FIG. 30 is a schematic structural diagram of a transmitter according to an embodiment of the present invention. The transmitter can implement downlink transmission of data in the case of no transmission resource restriction, no electromagnetic interference, and no radiation to the human body. As shown in FIG. 30, the transmitter may include:

a first processing unit 3001, configured to perform scrambling, constellation modulation, and MIMO precoding processing sequentially on downlink user data to obtain a precoded symbol sequence;

a second processing unit 3002, configured to perform resource mapping on the precoded symbol sequence obtained by the first processing unit 3001, to obtain frequency domain data of an OFDM symbol;

a third processing unit 3003, configured to perform conjugate symmetric extension on the frequency domain data of the OFDM symbol, where the frequency domain data of the OFDM symbol is obtained by the second processing unit 3002;

a fourth processing unit 3004, configured to perform IFFT on the frequency domain data after conjugate symmetric extension is performed by the third processing unit 3003, to obtain a time domain real-number sequence;

a fifth processing unit 3005, configured to perform CP insertion processing on the time domain real-number sequence obtained by the fourth processing unit 3004, to form a first downlink time domain baseband signal;

a sixth processing unit 3006, configured to load the first downlink time domain baseband signal onto a direct current of a LED lighting circuit to form a LED driving electrical signal; and a seventh processing unit 3007, configured to convert the LED driving electrical signal into a visible beam of a LED for transmission.

As shown in FIG. 30, the transmitter may further include:

an eighth processing unit 3008, configured to: before the third processing unit 3003 performs conjugate symmetric extension on the frequency domain data of the OFDM symbol, where the frequency domain data of the OFDM symbol is obtained by the second processing unit 3002, receive a first upper-layer scheduling command, where the first upper-layer scheduling command is used to instruct the transmitter to use a visible light communication mode to transmit data; and notify the third processing unit 3003 of performing conjugate symmetric extension on the frequency domain data of the OFDM symbol, where the frequency domain data of the OFDM symbol is obtained by the second processing unit 3002.

As an optional implementation manner, the eighth processing unit 3008 is further configured to: when receiving a second upper-layer scheduling command, where the second upper-layer scheduling command is used to instruct the transmitter to use a radio frequency communication mode to transmit data, notify the fourth processing unit 3004 of performing IFFT on the frequency domain data of the OFDM symbol, where the frequency domain data of the OFDM symbol is obtained by the second processing unit 3002.

Correspondingly, the fourth processing unit 3004 is further configured to: according to a notification of the eighth processing unit 3008, perform IFFT on the frequency domain data of the OFDM symbol, where the frequency domain data of the OFDM symbol is obtained by the second processing unit 3002, to obtain a time domain complex sequence; and output the time domain complex sequence to the fifth processing unit 3005.

Correspondingly, the fifth processing unit 3005 is further configured to perform CP insertion processing on the time domain complex sequence obtained by the fourth processing unit 3004, to form a second downlink time domain baseband signal; and transmit the second downlink time domain baseband signal through a radio frequency.

As an optional implementation manner, the sixth processing unit 3006 is further configured to perform amplification and pre-distortion processing on the first downlink time domain baseband signal before loading the first downlink time domain baseband signal onto the direct current of the LED lighting circuit.

In this embodiment of the present invention, the LED is located in any one LED light group that is formed by at least two LEDs. A visible beam of each LED in each LED light group transmits the same data, and a visible beam of each LED light group transmits the same data.

Alternatively, a visible beam of each LED in each LED light group transmits different data, and a visible beam of each LED light group transmits the same data.

Alternatively, a visible beam of each LED in each LED light group transmits different data, and a visible beam of each LED light group transmits different data.

Figure 31:
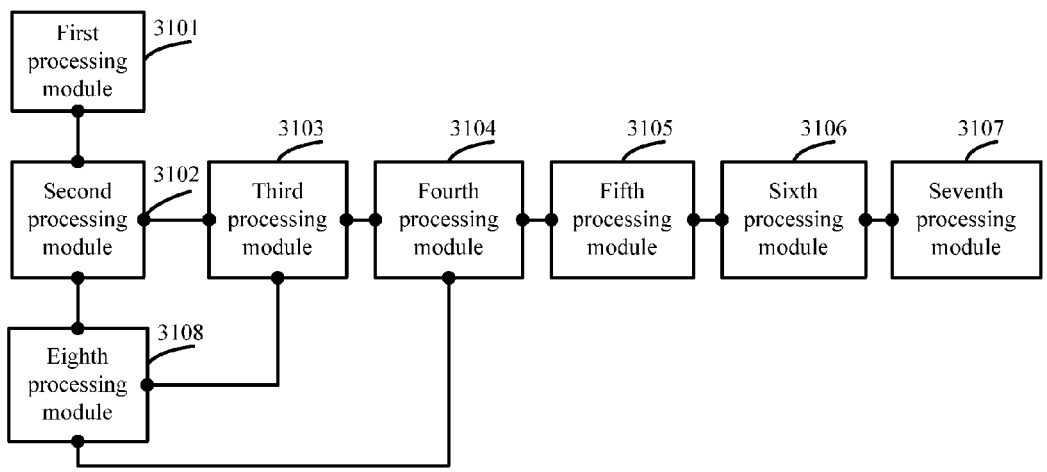
FIG. 31 is a schematic structural diagram of another transmitter according to an embodiment of the present invention.

Referring to FIG. 31, FIG. 31 is a schematic structural diagram of a transmitter according to an embodiment of the present invention. The transmitter can implement uplink transmission of data in the case of no transmission resource restriction, no electromagnetic interference, and no radiation to the human body. As shown in FIG. 31, the transmitter may include:

a first processing module 3101, configured to perform scrambling, constellation modulation, MIMO precoding, and DFT sequentially on uplink user data to obtain a DFT symbol sequence;

a second processing module 3102, configured to perform SC-FDMA resource mapping on the DFT symbol sequence obtained by the first processing module 3101, to obtain frequency domain data of an SC-FDMA symbol;

a third processing module 3103, configured to perform conjugate symmetric extension on the frequency domain data of the SC-FDMA symbol, where the frequency domain data of the SC-FDMA symbol is obtained by the second processing module 3102;

a fourth processing module 3104, configured to perform IFFT on the frequency domain data after conjugate symmetric extension is performed by the third processing module 3103, to obtain a time domain real-number sequence;

a fifth processing module 3105, configured to perform CP insertion processing on the time domain real-number sequence obtained by the fourth processing module 3104, to form a first uplink time domain baseband signal;

a sixth processing module 3106, configured to load the first uplink time domain baseband signal onto a direct current of a LED lighting circuit to form a LED driving electrical signal; and a seventh processing module 3107, configured to convert the LED driving electrical signal into a visible beam of a LED for transmission.

As an optional implementation manner, the transmitter shown in FIG. 31 may further include:

an eighth processing module 3108, configured to: before the third processing module 3101 performs conjugate symmetric extension on the frequency domain data of the SC-FDMA symbol, where the frequency domain data of the SC-FDMA symbol is obtained by the second processing module 3102, receive a first upper-layer scheduling command, where the first upper-layer scheduling command is used to instruct the transmitter to use a visible light communication mode to transmit data; and notify the third processing module 3103 of performing conjugate symmetric extension on the frequency domain data of the SC-FDMA symbol, where the frequency domain data of the SC-FDMA symbol is obtained by the second processing module 3102.

As an optional implementation manner, the eighth processing module 3108 is further configured to: when receiving a second upper-layer scheduling command, where the second upper-layer scheduling command is used to instruct the transmitter to use a radio frequency communication mode to transmit data, notify the fourth processing module 3104 of performing IFFT on the frequency domain data of the SC-FDMA symbol, where the frequency domain data of the SC-FDMA symbol is obtained by the second processing module 3102.

Correspondingly, the fourth processing module 3104 is further configured to: according to a notification of the eighth processing module 3108, perform IFFT on the frequency domain data of the SC-FDMA symbol, where the frequency domain data of the SC-FDMA symbol is obtained by the second processing module 3102, to obtain a time domain complex sequence; and output the time domain complex sequence to the fifth processing module 3105.

Correspondingly, the fifth processing module 3105 is further configured to perform CP insertion processing on the time domain complex sequence obtained by the fourth processing module 3104, to form a second uplink time domain baseband signal; and transmit the second uplink time domain baseband signal through a radio frequency.

Figure 32:
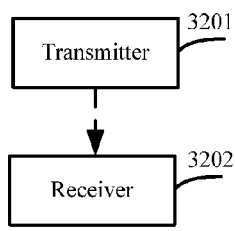
FIG. 32 is a schematic structural diagram of a data transmission system according to an embodiment of the present invention.

Referring to FIG. 32, FIG. 32 is a schematic structural diagram of a data transmission system according to an embodiment of the present invention. With the data transmission system, downlink transmission of data can be implemented in the case of no transmission resource restriction, no electromagnetic interference, and no radiation to the human body. As shown in FIG. 32, the system may include:

a transmitter 3201, configured to: perform scrambling, constellation modulation, and MIMO precoding processing sequentially on downlink user data to obtain a precoded symbol sequence; perform resource mapping on the precoded symbol sequence to obtain frequency domain data of an OFDM symbol; perform conjugate symmetric extension and IFFT on the frequency domain data of the OFDM symbol to obtain a time domain real-number sequence; perform CP insertion processing on the time domain real-number sequence to form a first downlink time domain baseband signal; load the first downlink time domain baseband signal onto a direct current of a LED lighting circuit to form a LED driving electrical signal; and convert the LED driving electrical signal into a visible beam of a LED for transmission; and a receiver 3202, configured to: receive a visible beam of the LED and perform optical-to-electrical conversion to obtain a first downlink time domain baseband signal; perform CP removal, FFT, and conjugate symmetry removal processing on the obtained first downlink time domain baseband signal to obtain frequency domain data of an OFDM symbol; perform resource demapping on the obtained frequency domain data of the OFDM symbol to obtain a precoded symbol sequence; and perform MIMO detection, channel equalization, constellation demodulation, and descrambling processing sequentially on the obtained precoded symbol sequence to obtain downlink user data.

As an optional implementation manner, the transmitter 3201 is further configured to receive a first upper-layer scheduling command before performing conjugate symmetric extension on frequency domain data, where the first upper-layer scheduling command is used to instruct the transmitter 3201 to use a visible light communication mode to transmit data.

As an optional implementation manner, the transmitter 3201 is further configured to: when receiving a second upper-layer scheduling command, where the second upper-layer scheduling command is used to instruct the transmitter 3201 to use a radio frequency communication mode to transmit data, perform IFFT and CP insertion processing on the frequency domain data of the OFDM symbol after obtaining the frequency domain data of the OFDM symbol, to form a second downlink time domain baseband signal; and transmit the second downlink time domain baseband signal through a radio frequency.

Correspondingly, the receiver 3202 is further configured to receive the second downlink time domain baseband signal that is transmitted by the transmitter 3201 through the radio frequency, and perform CP removal, FFT, resource demapping, MIMO detection, channel equalization, constellation demodulation, and descrambling processing sequentially to obtain downlink user data.

Figure 33:
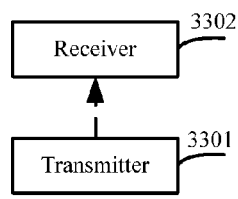
FIG. 33 is a schematic structural diagram of a data transmission system according to an embodiment of the present invention.

Referring to FIG. 33, FIG. 33 is a schematic structural diagram of a data transmission system according to an embodiment of the present invention. With the data transmission system, uplink transmission of data can be implemented in the case of no transmission resource restriction, no electromagnetic interference, and no radiation to the human body. As shown in FIG. 33, the system may include:

a transmitter 3301, configured to: perform scrambling, constellation modulation, MIMO precoding, and DFT sequentially on uplink user data to obtain a DFT symbol sequence; perform SC-FDMA resource mapping on the DFT symbol sequence to obtain frequency domain data of an SC-FDMA symbol; perform conjugate symmetric extension and IFFT on the frequency domain data of the SC-FDMA symbol to obtain a time domain real-number sequence; perform CP insertion on the time domain real-number sequence to form a first uplink time domain baseband signal; load the first uplink time domain baseband signal onto a direct current of a LED lighting circuit to form a LED driving electrical signal; and convert the LED driving electrical signal into a visible beam of a LED for transmission; and a receiver 3302, configured to: receive a visible beam of the LED and perform optical-to-electrical conversion to obtain a first uplink time domain baseband signal; perform CP removal, FFT, and conjugate symmetry removal processing on the obtained first uplink time domain baseband signal to obtain frequency domain data of an SC-FDMA symbol; and perform SC-FDMA resource demapping, IDFT, MIMO detection, channel equalization, constellation demodulation, and descrambling processing sequentially on obtained frequency domain data to obtain uplink user data.

As an optional implementation manner, the transmitter 3301 is further configured to receive a first upper-layer scheduling command before performing conjugate symmetric extension on the frequency domain data of the SC-FDMA symbol, where the first upper-layer scheduling command is used to instruct the transmitter 3301 to use a visible light communication mode to transmit data.

As an optional implementation manner, the transmitter 3301 is further configured to: when receiving a second upper-layer scheduling command, where the second upper-layer scheduling command is used to instruct the transmitter 3301 to use a radio frequency communication mode to transmit data, perform IFFT and CP insertion on the frequency domain data of the SC-FDMA symbol after obtaining the frequency domain data of the SC-FDMA symbol, to form a second uplink time domain baseband signal; and transmit the second uplink time domain baseband signal through a radio frequency.

Correspondingly, the receiver 3302 is further configured to receive the second uplink time domain baseband signal that is transmitted by the transmitter 3301 through the radio frequency, and perform CP removal, FFT, SC-FDMA resource demapping, IDFT, MIMO detection, channel equalization, constellation demodulation, and descrambling processing sequentially to obtain uplink user data.

Persons of ordinary skill in the art may understand that all or a part of the steps of the methods in the foregoing embodiments may be implemented by a program instructing relevant hardware. The program may be stored in a computer readable storage medium. The storage medium may include: a flash memory, a read-only memory (Read-Only Memory, ROM), a random access memory (Random Access Memory, RAM), a magnetic disk, or an optical disk.

The data transmission method and the related device and system provided in the embodiments of the present invention are described in detail in the foregoing. Although a principle and implementation manner of the present invention are described by using specific embodiments, the foregoing embodiments are only intended to help understand the method and core idea of the present invention. Meanwhile, according to the idea of the present invention, variations may be made by persons of ordinary skill in the art to the specific implementation manner and application scope. Therefore, the contents of this specification shall not be construed as a limitation on the present invention.

What is claimed is:

1. A data transmission method, comprising:
    performing, by a transmitter, scrambling, constellation modulation, and multiple-input multiple-output precoding processing sequentially on downlink user data to obtain a precoded symbol sequence;
    performing, by the transmitter, time-frequency resource mapping on the precoded symbol sequence to obtain frequency domain data of an orthogonal frequency division multiplexing symbol;
    performing, by the transmitter, conjugate symmetric extension and inverse fast Fourier transform on the frequency domain data of the orthogonal frequency division multiplexing symbol to obtain a time domain real-number sequence;
    performing, by the transmitter, cyclic prefix insertion processing on the time domain real-number sequence to form a first downlink time domain baseband signal;
    loading, by the transmitter, the first downlink time domain baseband signal onto a direct current of a light-emitting diode lighting circuit to form a light-emitting diode driving electrical signal; and
    converting, by the transmitter, the light-emitting diode driving electrical signal into a visible beam of the light-emitting diode for transmission.

2. The data transmission method according to claim 1, further comprising:
    receiving, by the transmitter, a first upper-layer scheduling command before performing the conjugate symmetric extension on the frequency domain data of the orthogonal frequency division multiplexing symbol, wherein the first upper-layer scheduling command is used to instruct the transmitter to use a visible light communication mode to transmit data.

3. The data transmission method according to claim 2, when the transmitter receives a second upper-layer scheduling command, wherein the second upper-layer scheduling command is used to instruct the transmitter to use a radio frequency communication mode to transmit data, after the transmitter obtains the frequency domain data of the orthogonal frequency division multiplexing symbol, the method further comprising:
    performing the inverse fast Fourier transform and the cyclic prefix insertion processing on the frequency domain data of the orthogonal frequency division multiplexing symbol to form a second downlink time domain baseband signal, and transmitting the second downlink time domain baseband signal through a radio frequency.

4. The data transmission method according to claim 1, further comprising:
    receiving, by a receiver, the visible beam of the light-emitting diode and performing optical-to-electrical conversion to obtain the first downlink time domain baseband signal;
    performing, by the receiver, cyclic prefix removal, fast Fourier transform, and conjugate symmetry removal processing on the obtained first downlink time domain baseband signal to obtain the frequency domain data of the orthogonal frequency division multiplexing symbol;
    performing, by the receiver, resource demapping on the obtained frequency domain data of the orthogonal frequency division multiplexing symbol to obtain the precoded symbol sequence; and
    performing, by the receiver, multiple-input multiple-output detection, channel equalization, constellation demodulation, and descrambling processing on the obtained precoded symbol sequence sequentially to obtain the downlink user data.

5. The data transmission method according to claim 1, wherein:
    after the transmitter performs the cyclic prefix insertion processing on the time domain real-number sequence to form the first downlink time domain baseband signal, the method further comprising:
    performing amplification and pre-distortion processing on the first downlink time domain baseband signal; and
    the loading, by the transmitter, the first downlink time domain baseband signal onto the direct current of the light-emitting diode lighting circuit to form the light-emitting diode driving electrical signal comprises:
    loading the first downlink time domain baseband signal after the amplification and pre-distortion processing onto the direct current of the light-emitting diode lighting circuit to form the light-emitting diode driving electrical signal.

6. The data transmission method according to claim 1, wherein:
the light-emitting diode is located in any one light-emitting diode light group that is formed by at least two light-emitting diodes, wherein a visible beam of each light-emitting diode in each light-emitting diode light group transmits same data, and a visible beam of each light-emitting diode light group transmits the same data; or
a visible beam of each light-emitting diode in each light-emitting diode light group transmits different data, and a visible beam of each light-emitting diode light group transmits the same data; or
a visible beam of each light-emitting diode in each light-emitting diode light group transmits different data, and a visible beam of each light-emitting diode light group transmits different data.

7. A data transmission method, comprising:
performing, by a transmitter, scrambling, constellation modulation, multiple-input multiple-output precoding, and discrete Fourier transform processing sequentially on uplink user data to obtain a discrete Fourier transform symbol sequence;
performing, by the transmitter, single-carrier frequency division multiple access resource mapping on the discrete Fourier transform symbol sequence to obtain frequency domain data of a single-carrier frequency division multiple access symbol;
performing, by the transmitter, conjugate symmetric extension and inverse fast Fourier transform on the frequency domain data of the single-carrier frequency division multiple access symbol to obtain a time domain real-number sequence;
performing, by the transmitter, cyclic prefix insertion processing on the time domain real-number sequence to form a first uplink time domain baseband signal;
loading, by the transmitter, the first uplink time domain baseband signal onto a direct current of a light-emitting diode lighting circuit to form a light-emitting diode driving electrical signal; and
converting, by the transmitter, the light-emitting diode driving electrical signal into a visible beam of the light-emitting diode for transmission.

8. The data transmission method according to claim 7, further comprising:
receiving, by the transmitter, a first upper-layer scheduling command before performing the conjugate symmetric extension on the frequency domain data of the single-carrier frequency division multiple access symbol, wherein the first upper-layer scheduling command is used to instruct the transmitter to use a visible light communication mode to transmit data.

9. The data transmission method according to claim 8, when the transmitter receives a second upper-layer scheduling command, wherein the second upper-layer scheduling command is used to instruct the transmitter to use a radio frequency communication mode to transmit data, after the transmitter obtains the frequency domain data of the single-carrier frequency division multiple access symbol, the method further comprising:
performing the inverse fast Fourier transform and the cyclic prefix insertion processing on the frequency domain data of the single-carrier frequency division multiple access symbol to form a second uplink time domain baseband signal, and transmitting the second uplink time domain baseband signal through a radio frequency.

10. The data transmission method according to claim 7, further comprising:
receiving, by a receiver, the visible beam of the light-emitting diode and performing optical-to-electrical conversion to obtain the first uplink time domain baseband signal;
performing, by the receiver, cyclic prefix removal, fast Fourier transform, and conjugate symmetry removal processing on the obtained first uplink time domain baseband signal to obtain the frequency domain data of the single-carrier frequency division multiple access symbol; and
performing, by the receiver, single-carrier frequency division multiple access resource demapping, inverse discrete Fourier transform, multiple-input multiple-output detection, channel equalization, constellation demodulation, and descrambling processing sequentially on the obtained frequency domain data of the single-carrier frequency division multiple access symbol to obtain the uplink user data.

11. A transmitter, comprising:
a first processing unit, configured to perform scrambling, constellation modulation, and multiple-input multiple-output precoding processing sequentially on downlink user data to obtain a precoded symbol sequence;
a second processing unit, configured to perform time-frequency resource mapping on the precoded symbol sequence obtained by the first processing unit, to obtain frequency domain data of an orthogonal frequency division multiplexing symbol;
a third processing unit, configured to perform conjugate symmetric extension on the frequency domain data of the orthogonal frequency division multiplexing symbol, wherein the frequency domain data of the orthogonal frequency division multiplexing symbol is obtained by the second processing unit;
a fourth processing unit, configured to perform inverse fast Fourier transform on the frequency domain data obtained after the conjugate symmetric extension is performed by the third processing unit, to obtain a time domain real-number sequence;
a fifth processing unit, configured to perform cyclic prefix insertion processing on the time domain real-number sequence obtained by the fourth processing unit, to form a first downlink time domain baseband signal;
a sixth processing unit, configured to load the first downlink time domain baseband signal onto a direct current of a light-emitting diode lighting circuit to form a light-emitting diode driving electrical signal; and
a seventh processing unit, configured to convert the light-emitting diode driving electrical signal into a visible beam of the light-emitting diode for transmission.

12. The transmitter according to claim 11, further comprising:
an eighth processing unit, configured to: before the third processing unit performs the conjugate symmetric extension on the frequency domain data of the orthogonal frequency division multiplexing symbol, wherein the frequency domain data of the orthogonal frequency division multiplexing symbol is obtained by the second processing unit, receive a first upper-layer scheduling command, wherein the first upper-layer scheduling command is used to instruct the transmitter to use a visible light communication mode to transmit data; and notify the third processing unit of performing the conjugate symmetric extension on the frequency domain data of the orthogonal frequency division multiplexing symbol, wherein the frequency domain data of the orthogonal frequency division multiplexing symbol is obtained by the second processing unit.

13. The transmitter according to claim 12, wherein:
the eighth processing unit is further configured to: when receiving a second upper-layer scheduling command, wherein the second upper-layer scheduling command is used to instruct the transmitter to use a radio frequency communication mode to transmit data, notify the fourth processing unit of performing inverse fast Fourier transform on the frequency domain data of the orthogonal frequency division multiplexing symbol, wherein the frequency domain data of the orthogonal frequency division multiplexing symbol is obtained by the second processing unit;
the fourth processing unit is further configured to: according to a notification of the eighth processing unit, perform the inverse fast Fourier transform on the frequency domain data of the orthogonal frequency division multiplexing symbol, wherein the frequency domain data of the orthogonal frequency division multiplexing symbol is obtained by the second processing unit, to obtain a time domain complex sequence; and output the time domain complex sequence to the fifth processing unit; and
the fifth processing unit is further configured to perform the cyclic prefix insertion processing on the time domain complex sequence obtained by the fourth processing unit, to form a second downlink time domain baseband signal; and transmit the second downlink time domain baseband signal through a radio frequency.

14. The transmitter according to claim 11, wherein:
the sixth processing unit is further configured to perform amplification and pre-distortion processing on the first downlink time domain baseband signal before loading the first downlink time domain baseband signal onto the direct current of the light-emitting diode lighting circuit.

15. The transmitter according to claim 11, wherein:
the light-emitting diode is located in any one light-emitting diode light group that is formed by at least two light-emitting diodes, wherein a visible beam of each light-emitting diode in each light-emitting diode light group transmits same data, and a visible beam of each light-emitting diode light group transmits the same data; or
a visible beam of each light-emitting diode in each light-emitting diode light group transmits different data, and a visible beam of each light-emitting diode light group transmits same data; or
a visible beam of each light-emitting diode in each light-emitting diode light group transmits different data, and a visible beam of each light-emitting diode light group transmits different data.

16. A transmitter, comprising:
a first processing module, configured to perform scrambling, constellation modulation, multiple-input multiple-output precoding, and discrete Fourier transform processing sequentially on uplink user data to obtain a discrete Fourier transform symbol sequence;
a second processing module, configured to perform single-carrier frequency division multiple access resource mapping on the discrete Fourier transform symbol sequence obtained by the first processing module, to obtain frequency domain data of a single-carrier frequency division multiple access symbol;
a third processing module, configured to perform conjugate symmetric extension on the frequency domain data of the single-carrier frequency division multiple access symbol, wherein the frequency domain data of the single-carrier frequency division multiple access symbol is obtained by the second processing module;
a fourth processing module, configured to perform inverse fast Fourier transform on the frequency domain data obtained after the conjugate symmetric extension is performed by the third processing module, to obtain a time domain real-number sequence;
a fifth processing module, configured to perform cyclic prefix insertion processing on the time domain real-number sequence obtained by the fourth processing module, to form a first uplink time domain baseband signal;
a sixth processing module, configured to load the first uplink time domain baseband signal onto a direct current of a light-emitting diode lighting circuit to form a light-emitting diode driving electrical signal; and
a seventh processing module, configured to convert the light-emitting diode driving electrical signal into a visible beam of the light-emitting diode for transmission.

17. The transmitter according to claim 16, further comprising:
an eighth processing module, configured to: before the third processing module performs the conjugate symmetric extension on the frequency domain data of the single-carrier frequency division multiple access symbol, wherein the frequency domain data of the single-carrier frequency division multiple access symbol is obtained by the second processing module, receive a first upper-layer scheduling command, wherein the first upper-layer scheduling command is used to instruct the transmitter to use a visible light communication mode to transmit data; and notify the third processing module of performing the conjugate symmetric extension on the frequency domain data of the single-carrier frequency division multiple access symbol, wherein the frequency domain data of the single-carrier frequency division multiple access symbol is obtained by the second processing module.

18. The transmitter according to claim 17, wherein:
the eighth processing module is further configured to: when receiving a second upper-layer scheduling command, wherein the second upper-layer scheduling command is used to instruct the transmitter to use a radio frequency communication mode to transmit data, notify the fourth processing module of performing the inverse fast Fourier transform on the frequency domain data of the single-carrier frequency division multiple access symbol, wherein the frequency domain data of the single-carrier frequency division multiple access symbol is obtained by the second processing module;
the fourth processing module is further configured to: according to a notification of the eighth processing module, perform the inverse fast Fourier transform on the frequency domain data of the single-carrier frequency division multiple access symbol, wherein the frequency domain data of the single-carrier frequency division multiple access symbol is obtained by the second processing module, to obtain a time domain complex sequence; and output the time domain complex sequence to the fifth processing module; and
the fifth processing module is further configured to perform the cyclic prefix insertion processing on the time domain complex sequence obtained by the fourth processing module, to form a second uplink time domain baseband signal, and transmit the second uplink time domain baseband signal through a radio frequency.

* * * * *